US00RE49644E

(19) United States
(12) Reissued Patent
Karabinis

(10) Patent Number: US RE49,644 E
(45) Date of Reissued Patent: Sep. 5, 2023

(54) SYSTEMS AND/OR METHODS OF DATA ACQUISITION FROM A TRANSCEIVER

(71) Applicant: Odyssey Wireless, Inc., Cary, NC (US)

(72) Inventor: Peter D. Karabinis, Cary, NC (US)

(21) Appl. No.: 17/220,584

(22) Filed: Apr. 1, 2021

Related U.S. Patent Documents

Reissue of:
(64) Patent No.: 8,970,351
Issued: Mar. 3, 2015
Appl. No.: 13/753,700
Filed: Jan. 30, 2013

U.S. Applications:
(60) Continuation of application No. 16/282,494, filed on Feb. 22, 2019, now Pat. No. Re. 48,562, which is a
(Continued)

(51) Int. Cl.
*H04Q 5/22* (2006.01)
*G08G 1/01* (2006.01)
(Continued)

(52) U.S. Cl.
CPC ..... *G06K 7/01* (2013.01); *G01D 21/00* (2013.01); *G08G 1/01* (2013.01); *G08G 1/017* (2013.01);
(Continued)

(58) Field of Classification Search
CPC ..... G08G 1/09675; G08G 1/096783; G08G 1/096775; G08G 1/01; G08G 1/017;
(Continued)

(56) References Cited

U.S. PATENT DOCUMENTS 3,824,469 A 7/1974 Ristenbatt
4,303,904 A * 12/1981 Chasek ..... G07F 7/02 340/928
(Continued)

FOREIGN PATENT DOCUMENTS

DE 43 41 813 A1 6/1995
EP 1 090 800 A2 4/2001
(Continued)

OTHER PUBLICATIONS

"Surveillance Vision Plan, Revision 2" United States Department of Transportation, Federal Aviation Administration AND-440 (77 pages) (Jul. 1, 1996).
(Continued)

*Primary Examiner* — Ovidio Escalante
(74) *Attorney, Agent, or Firm* — Carlson, Caspers, Vandenburgh & Lindquist, P.A.

(57) ABSTRACT

Systems and/or Methods are disclosed for acquiring data from a transceiver responsive to one or more signals that are received at the transceiver from one or more devices. In one embodiment, a transceiver is configured to transmit a signal responsive to having received a first signal from a first device, wherein the signal that is transmitted by the transceiver is configured to trigger a second device to transmit a second signal. The transceiver is further configured to transmit data responsive to having received the second signal that is transmitted by the second device. In other embodiments, a transceiver is configured to receive a signal from a first device over frequencies of a predetermined frequency band that the first device is authorized to use, to receive a signal from a second device over frequencies of the predetermined frequency band and to transmit data responsive to having received both the signal from the first device and the signal from the second device. The transceiver is further configured to require that both the signal from the first device and the signal from the second device be received at the transceiver before the data is transmitted. Analogous methods are also disclosed.

10 Claims, 9 Drawing Sheets

Related U.S. Application Data continuation of application No. 15/444,486, filed on Feb. 28, 2017, now Pat. No. Re. 47,408, which is an application for the reissue of Pat. No. 8,970,351, which is a division of application No. 12/620,122, filed on Nov. 17, 2009, now Pat. No. 8,665,068, which is a continuation of application No. 11/855,332, filed on Sep. 14, 2007, now Pat. No. 7,642,897, which is a continuation of application No. 10/506,365, filed as application No. PCT/US03/07770 on Mar. 13, 2003, now Pat. No. 7,286,040.

(60) Provisional application No. 60/364,303, filed on Mar. 14, 2002.

(51) Int. Cl.

| | |
|---|---|
| ***G06K 7/01*** | (2006.01) |
| ***G01D 21/00*** | (2006.01) |
| ***G08G 1/017*** | (2006.01) |
| ***G08G 1/0967*** | (2006.01) |
| *G08G 1/00* | (2006.01) |
| *H04W 24/00* | (2009.01) |

(52) U.S. Cl.
CPC ... *G08G 1/09675* (2013.01); *G08G 1/096716* (2013.01); *G08G 1/096741* (2013.01); *G08G 1/096775* (2013.01); *G08G 1/096783* (2013.01); *G08G 1/205* (2013.01); *H04W 24/00* (2013.01)

(58) Field of Classification Search
CPC .. G08G 1/096741; G08G 1/205; G01D 21/00; G06K 7/01; H04W 24/00
USPC ..... 340/10.3, 441, 466, 5.2
See application file for complete search history.

(56) References Cited

U.S. PATENT DOCUMENTS 4,591,823 A 5/1986 Horvat
4,768,220 A 8/1988 Yoshihara et al.
4,818,998 A 4/1989 Apsell et al.
5,014,052 A 5/1991 Obeck
5,067,147 A 11/1991 Lee
5,093,924 A 3/1992 Toshiyuki et al.
5,194,846 A 3/1993 Lee et al.
5,243,598 A 9/1993 Lee
5,289,183 A * 2/1994 Hassett et al. ..... 340/905
5,309,503 A 5/1994 Bruckert et al.
5,349,631 A 9/1994 Lee
5,351,052 A * 9/1994 D'Hont ..... G08G 1/017 342/44
5,420,794 A 5/1995 James
5,438,329 A 8/1995 Gastouniotis et al.
5,483,666 A 1/1996 Yamada et al.
5,491,469 A 2/1996 Schwendeman
5,550,536 A 8/1996 Flaxl
5,565,858 A 10/1996 Guthrie
5,608,723 A 3/1997 Felsenstein
5,621,412 A 4/1997 Sharpe et al.
5,625,672 A 4/1997 Yamada
5,729,590 A 3/1998 Dimitriadis et al.
5,732,360 A 3/1998 Jarett et al.
5,737,705 A 4/1998 Ruppel et al.
5,745,049 A * 4/1998 Akiyama ..... G05B 19/4183 342/51
5,771,454 A 6/1998 Ohsawa
5,787,346 A 7/1998 Iseyama
5,794,151 A 8/1998 McDonald et al.
5,812,522 A 9/1998 Lee et al.
5,822,698 A 10/1998 Tang et al.
5,828,963 A 10/1998 Grandhi et al.
5,870,392 A 2/1999 Ann
5,887,176 A * 3/1999 Griffith ..... G06K 19/0705 340/10.33
5,898,384 A 4/1999 Alt et al.
5,898,683 A 4/1999 Matsumoto et al.
5,915,219 A 6/1999 Pöyhönen
5,920,818 A 7/1999 Frodigh et al.
5,924,030 A 7/1999 Rautiola et al.
5,960,351 A 9/1999 Przelomiec
5,960,352 A 9/1999 Cherpantier
5,963,129 A 10/1999 Warner
5,963,848 A 10/1999 D'Avello
5,978,117 A 11/1999 Koonen
6,023,459 A 2/2000 Clark et al.
6,032,046 A 2/2000 Nakano
6,052,595 A 4/2000 Schellinger et al.
6,064,320 A * 5/2000 d'Hont ..... G07B 15/063 342/51
6,104,285 A * 8/2000 Stobbe ..... G08B 13/2482 340/568.1
6,107,917 A 8/2000 Carrender et al.
6,112,152 A 8/2000 Tuttle
6,124,810 A 9/2000 Segal et al.
6,127,928 A 10/2000 Issacman et al.
6,219,539 B1 4/2001 Basu et al.
6,219,613 B1 4/2001 Terrier et al.
6,223,125 B1 4/2001 Hall
6,246,954 B1 6/2001 Berstis et al.
6,259,991 B1 7/2001 Nysen
6,314,299 B1 11/2001 Schreib et al.
6,317,598 B1 11/2001 Wiesen et al.
6,326,903 B1 12/2001 Gross et al.
6,381,231 B1 4/2002 Silventoinen et al.
6,396,417 B2 5/2002 Lee
6,404,751 B1 6/2002 Roark et al.
6,418,317 B1 7/2002 Cuffaro et al.
6,442,473 B1 8/2002 Berstis et al.
6,463,279 B1 10/2002 Sherman et al.
6,512,752 B1 1/2003 H'mimy et al.
6,535,544 B1 3/2003 Partyka
6,538,563 B1 3/2003 Heng
6,570,487 B1 5/2003 Steeves
6,606,033 B1 8/2003 Crocker et al.
6,614,387 B1 9/2003 Deadman
6,631,268 B1 10/2003 Lilja
6,653,946 B1 11/2003 Hassett
6,661,352 B2 12/2003 Tiernay et al.
6,674,966 B1 1/2004 Koonen
6,704,546 B1 3/2004 Lucidarme et al.
6,747,558 B1 * 6/2004 Thorne et al. ..... 340/551
6,864,784 B1 3/2005 Loeb
6,901,057 B2 5/2005 Rune et al.
6,975,667 B2 12/2005 Mattisson et al.
6,975,865 B1 12/2005 Väisänen
6,980,838 B2 12/2005 Hiben et al.
6,985,090 B2 1/2006 Ebner et al.
6,990,348 B1 1/2006 Benveniste
7,026,935 B2 4/2006 Diorio et al.
7,044,387 B2 5/2006 Becker et al.
7,095,719 B1 8/2006 Wilhelmsson et al.
7,099,675 B2 8/2006 Keutmann et al.
7,133,680 B2 11/2006 Crisan
7,233,260 B2 6/2007 Tang et al.
7,245,602 B2 7/2007 Skubic et al.
7,257,426 B1 * 8/2007 Witkowski et al. ..... 455/569.2
7,283,037 B2 10/2007 Diorio et al.
7,286,040 B2 10/2007 Karabinis
7,307,964 B2 12/2007 Nakai et al.
7,328,004 B1 2/2008 Wolters et al.
7,335,525 B2 2/2008 Cole
7,342,500 B2 3/2008 Ho et al.
7,479,896 B2 1/2009 Ho et al.
7,605,842 B2 * 10/2009 Wilsey et al. ..... 348/148
7,642,897 B2 1/2010 Karabinis
7,792,484 B2 9/2010 Andreason
8,665,068 B2 * 3/2014 Karabinis ..... 340/10.1
2001/0002906 A1 6/2001 Rune
2001/0002908 A1 6/2001 Rune et al.
2001/0016499 A1 8/2001 Hamabe

(56) References Cited

U.S. PATENT DOCUMENTS

| | | | | |
|---|---|---|---|---|
| 2001/0020198 | A1 | 9/2001 | Wilson | |
| 2001/0044697 | A1 | 11/2001 | Kageyama | |
| 2001/0049284 | A1 | 12/2001 | Liu et al. | |
| 2002/0059612 | A1 | 5/2002 | Kita | |
| 2002/0065099 | A1 | 5/2002 | Bjorndahl | |
| 2002/0175805 | A9* | 11/2002 | Armstrong | G08B 13/2488 340/10.2 |
| 2003/0007473 | A1 | 1/2003 | Strong et al. | |
| 2003/0016143 | A1 | 1/2003 | Ghazarian | |
| 2003/0060159 | A1 | 3/2003 | Brynielsson | |
| 2003/0072322 | A1* | 4/2003 | Collins | H04L 12/413 370/445 |
| 2004/0248573 | A1 | 12/2004 | Wandel | |
| 2007/0137514 | A1 | 6/2007 | Kumar et al. | |
| 2013/0342368 | A1 | 12/2013 | Nathanson | |
| 2016/0054140 | A1 | 2/2016 | Breed | |
| 2019/0149960 | A1 | 5/2019 | Himmelstein | |

FOREIGN PATENT DOCUMENTS

| | | | |
|---|---|---|---|
| EP | 1 090 800 | A3 | 4/2001 |
| EP | 1 241 632 | A1 | 9/2002 |
| EP | 1 255 374 | A2 | 11/2002 |
| FR | 2 649 517 | A1 | 1/1991 |
| WO | WO 99/53446 | A1 | 10/1999 |
| WO | WO 01/50435 | A1 | 7/2001 |
| WO | WO 01/58181 | A2 | 8/2001 |
| WO | WO 01/58181 | A3 | 8/2001 |

OTHER PUBLICATIONS

"Surveillance Vision Plan, Revision 2" United States Department of Transportation, Federal Aviation Administration AND-440, pp. ES-5 and VI-3 (2 pages) (Jul. 1, 1996).

Communication with Supplementary European Search Report, EP 03 75 0021, Aug. 31, 2006.

International Search Report PCT/US03/07770,Ju1. 2, 2004.

Brickhouse et al., "Urban In-Building Cellular Frequency Reuse", *IEEE Global Telecommunications Conference*, vol. 2 Nov. 1996, pp. 1192-1196.

Cover, "Broadcast Channels", *IEEE Trans on Info. Theory*, vol. 18, No. 1, Jan. 1972, pp. 2-14.

Drucker, "Development and Application of a Cellular Repeater", *Proc. IEEE Vehicular Technology Conference*, Jun. 1988, pp. 321-325.

Finean, "*Satellite Access in FPLMTS*", PhD Thesis Review and Contents, University of Surrey Centre for Satellite Engineering Research, downloaded May 15, 2012 from rfinean.tripod.com/PhD/.

Finean, *Satellite Channel Assignment*, Chapter 7 from PhD Thesis "*Satellite Access in FPLMTS*", University of Surrey Centre for Satellite Engineering Research, 1996, pp. 79-115.

Galda et al., "A Low Complexity Transmitter Structure for OFDM-FDMA Uplink Systems" *IEEE 55th Vehicular Technology Conference*, 2002, vol. 4, May 2002, pp. 1737-1741.

Gallager, "A Perspective on Multi-Access Channels", *IEEE Trans. on Info. Theory*, vol. 31, No. 2, Mar. 1985, pp. 124-142.

Iyer et al., "Intelligent Networking for Digital Cellular System and the Wireless World", *Proc. IEEE Globecom*, vol. 1, Dec. 1990, pp. 475-479.

MacKenzie et a1., "*Game Theory and the Design of Self-Configuring, Adaptive Wireless Networks*", IEEE Communications Magazine, Nov. 2001, pp. 126-131.

Murray et al., "*Adaptive Radio Resource Management for GSM/GPRS Networks*", ISCC, Cork Ireland, Nov. 27, 2001, 6 pp.

Quinn, "The Cell Enhancer", *Proc. IEEE Vehicular Technology Conference*, vol. 36, May 1986, pp. 77-83.

Silventoinen et al., "Analysis of a New Channel Access Method for Home Base Station", *5th IEEE International Conference on Universal Personal Communications*, Nokia Res. Center, Helsinki, Sep. 29-Oct. 2, 1996, pp. 930-935.

Stocker, "Small-Cell Mobile Phone Systems", *IEEE Trans. on Vehicular Technology*, vol. 33, No. 4, Nov. 1984, pp. 269-275.

Walser, "Feasible Cellular Frequency Assignment Using Constraint Programming Abstractions", *Proceedings of the Workshop on Constraint Programming Applications*, Aug. 1996, 10 pp.

Wyner, Shannon-Theoretic Approach to a Gaussian Cellular Multiple-Access Channel, *IEEE Transactions on Information Theory*, vol. 40, No. 6, Nov. 1994, pp. 1713-1727.

USPTO Patent Full-Text and Image Database, Patent Database Search Results: ACLM/"unlicensed frequency band" in US Patent Collection, retrieved Dec. 10, 2014 from http://patft.uspto.gov/netacgi/nph-Parser?Sect1=PTO2&Sect2=HITOFF&p=1&u=%2Fne . . . .

Federal Communications Commission, "Access Spectrum" retrieved Dec. 12, 2014 from http://www.fcc.gov/encyclopedia/accessing-spectrum, 2 pp.

Motorola, White Paper: "Licensed Versus Unlicensed Wireless", retrieved Dec. 12, 2014 from http://www.winncom.com/images/stories/Motorola_Licensed_Versus_Unlicensed_Wireless_WP.pdf, 6 pp.

TechTarget, "What's the difference between licensed and unlicensed Wireless?", retrieved Dec. 12, 2014 from http://searchnetworking.techtarget.com/answer/Whats-the-difference-between-licensed-and-unlicensed-wireless, 6 pp.

Tetz, "Radio Frequencies and Wireless Networks", retrieved Dec. 12, 2014 from http://www.dummies.com/how-to/content/radio-frequencies-and-wireless-networks.html, 3 pp.

* cited by examiner

Elements

Illustrative Interrogator Packet

Illustrative Transponder Packet.

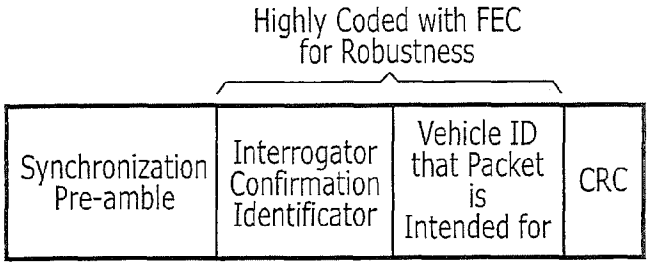
Illustrative Confirmation Packet Sent to Transponder by Interrogator.
FIG. 4
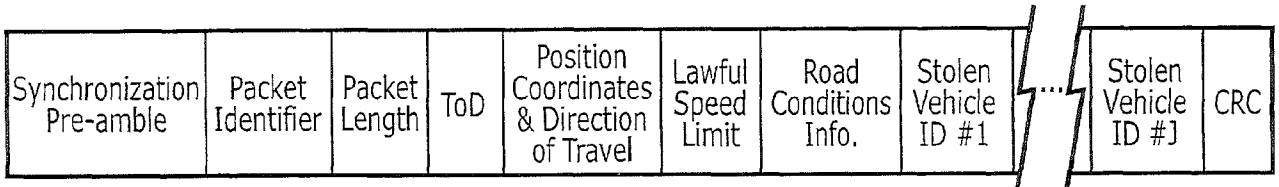
Illustrative Frame Format for "Road Conditions" Notificator Packet
FIG. 5a
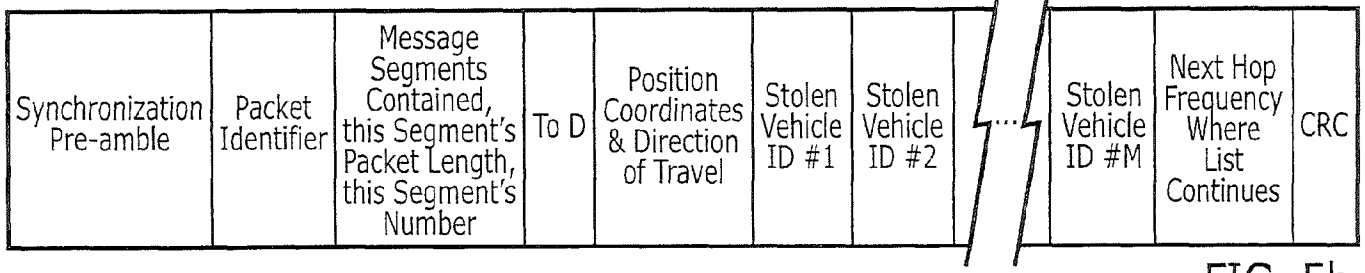
Illustrative Frame Format for "Stolen Vehicle List" Notification Packet
FIG. 5b
FIG. 5
Note: Combinations of (a) & (b) are also Possible
Illustrative Notificator Packets Time-Frequency Plan of First Preferred Embodiment Time-Frequency Plan of Second Preferred Embodiment Illustrative Traffic Light Notificators Illustrative Traffic Light Notificator Packet Formats Network Elements of CVIS

SYSTEMS AND/OR METHODS OF DATA ACQUISITION FROM A TRANSCEIVER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application is a *reissue continuation of U.S. patent application Ser. No. 16/282,494, filed Feb. 22, 2019, which itself is a reissue continuation of U.S. patent application Ser. No. 15/444,486, filed Feb. 28, 2017 (now U.S. Pat. No. RE47,408), which is an application for reissue of U.S. Pat. No. 8,970,351, for which U.S. patent application Ser. No. 13/753,700 was filed on Jan. 30, 2013 as a* divisional of U.S. patent application Ser. No. 12/620,122, filed Nov. 17, 2009, entitled Systems and/or Methods of Data Acquisition From a Transceiver, now U.S. Pat. No. 8,665,068, which itself is a continuation of U.S. patent application Ser. No. 11/855,332, filed Sep. 14, 2007, entitled A Cooperative Vehicular Identification System, now U.S. Pat. No. 7,642,897, which itself is a continuation of U.S. patent application Ser. No. 10/506,365, filed Sep. 2, 2004, entitled A Cooperative Vehicular Identification System, now U.S. Pat. No. 7,286,040, which itself is a 35 U.S.C. §371 national phase application of PCT International Application No. PCT/US03/07770, having an international filing date of Mar. 13, 2003, which itself claims the benefit of U.S. provisional Application No. 60/364,303, filed Mar. 14, 2002, entitled A Cooperative Vehicular Identification System, the disclosures of all of which are incorporated herein by reference in their entirety. The above PCT International Application was published in the English language and has International Publication No. WO 03/096128 A2.

BACKGROUND OF THE INVENTION

Violations of motor vehicle laws, such as speeding laws, may become an increasing concern as highways become more crowded with ever increasing numbers of vehicles. Electronic systems for monitoring vehicles are described in U.S. Pat. No. 6,107,917 to Carrender et al., entitled Electronic Tag Including RF Modem for Monitoring Motor Vehicle Performance With Filtering; U.S. Pat. No. 6,124,810 to Segal et al., entitled Method and Apparatus for Automatic Event Detection in a Wireless Communication System; and U.S. Pat. No. 6,223,125 to Hall, entitled Collision Avoidance System.

SUMMARY OF THE INVENTION

Cooperative Vehicular Identification Systems and Methods, capable of monitoring and recording vehicular law violations, with the assistance and cooperation of the vehicles in violation, are disclosed. In accordance with some embodiments of the invention, real-time information from vehicular sensors is communicated to a Central Processing Unit (CPU). Strategically located Interrogator devices, on roads/highways, at intersections, in and around school zones, integrated with traffic lights, etc., issue inquiries/interrogations to passing-by vehicles. Vehicles proximate to such Interrogators respond with unique identifying information and with parameter lists provided by their vehicular sensors. In some embodiments, each Interrogator inquiry provides data, including the lawful parameter limits (i.e. speed limit) associated with its location. In response to having successfully decoded an inquiry, and in response to the state of its vehicular sensors, a vehicular Transponder may transmit information to the specific Interrogator that has issued an inquiry. The Interrogator then relays relevant identifying information to the CPU for further processing.

Cooperative Vehicular Identification Systems and Methods according to some embodiments of the invention, hereinafter referred to as CVIS, may also provide a public service to motorists by delivering real-time road-specific reports relating to traffic, accidents, weather conditions, etc. In other embodiments, CVIS may further provide a service to motorists by delivering store-and-forward messages (e-mail) to and from their vehicles. In other embodiments, CVIS may also serve as a "mobile yellow pages" providing selective, area-specific information relevant to leisure, shopping, and/or entertainment activities, in response to motorist initiated inquiries. Some embodiments may also provide distress assistance to motorists. Toll collections may be handled very effectively, and some embodiments may even be configured to tell you where to find a parking spot as you approach a parking area.

CVIS can pay for itself very quickly with the dollars of vehicular law violators. Significant new revenue may be generated for State and Local authorities since many or every violator can be apprehended electronically. CVIS may derive additional revenues from services provided to commerce and/or individuals, or may chose to offer (at least some) of its services free of charge as a public service to the community.

Significant business potential exists for industry that may engage in the development, manufacturing, deployment, maintenance, and upgrades to CVIS. In the United States alone, more than 15 Million (lightweight) new cars are sold each year, and there are more that 200 Million such vehicles already in operation. There are also more than 40 Million fleet vehicles US-wide. For all of these vehicles to be CVIS compliant, according to some embodiments of the invention, each one may be equipped with a Transponder. The number of Interrogators that could be deployed US-wide could exceed tens of thousands.

Following the successful deployment of CVIS in the United States, deployment in other countries may follow.

Besides detecting violations such as speeding, some embodiments of CVIS will also be able to detect events such as not having stopped at a red light and/or a stop sign, and will be able to search, locate, and track a vehicle, in response to law enforcement commands, throughout a city and/or throughout the entire country.

BRIEF DESCRIPTION OF THE DRAWINGS

FIG. 4 schematically illustrates confirmation packets according to various embodiments of the present invention.

FIGS. 5A and 5B, which together form FIG. 5, schematically illustrate notificator packets according to various embodiments of the present invention.

DETAILED DESCRIPTION

1. Introduction and Summary

Figure 1:
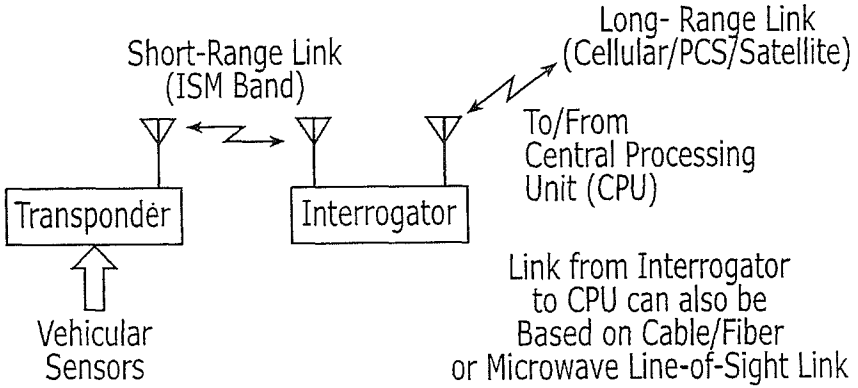
FIG. 1 is a block diagram of systems and methods according to various embodiments of the present invention.

Embodiments of CVIS described hereinbelow can potentially benefit society in significant ways. Some embodiments of CVIS may:

(1) Save lives (many lives).

(2) Reduce significantly the number of vehicular accidents, minor and major, and the associated injuries, suffering, and expense/loss in productivity.

(3) Stabilize and even reduce car insurance premiums (as a consequence of (1) & (2) above).

(4) Instill a heightened awareness of lawful driving behavior to the public at-large (thus re-enforcing (1) through (3) above).

(5) Be a strong anti-theft deterrent.

(6) Offer emergency/distress assistance to motorists.

(7) Offer real-time, road-specific, information to motorists as well as other more general information, for leisure and recreational activities, including personal messaging.

A focus of CVIS is on strengthening vehicular law enforcement and mitigating irresponsible driving behavior, thus improving safety for pedestrians and drivers alike. Deployment of CVIS can make vehicular law enforcement automatic, efficient, non-discriminatory, quick, non-intrusive, and/or transparent to the violator and law enforcement agency alike. While being an instrument of beneficial social engineering, embodiments of CVIS also can generate significant new revenues for state/county law-enforcement agencies and can thus pay for itself with the dollars of those who violate the Law. Embodiments of CVIS may thus be envisioned as a selective tax imposed only on vehicular law violators. Other embodiments of CVIS, however, may also generate revenue by delivering area-specific commercial, leisure, and/or recreational information to motorists' vehicles. That is, some embodiments of CVIS can be a "mobile yellow pages" for restaurants, cinemas, stores/malls, promotions, etc, as well as a system for delivering store-and-forward personal messages and/or e-mail to people in transit.

To those who will criticize CVIS as being a "Big Brother is Watching" type of a system, we offer this simple response: Driving on public roads and highways is a necessity of modern life, and is an activity conducted daily by an overwhelming majority of the adult population. Driving on public roads and highways, therefore, is an activity that impacts almost all people daily, either directly or indirectly. Because of its broad reaching affects on society, driving must be conducted responsibly and within the guidelines set forth by Law. According to some embodiments of CVIS, while a driver's activities remain lawful, "Big Brother" is blind. Only when a motorist's actions violate the Law, only then do Big Brother's eyes open to take notice.

We have all witnessed the reckless driver who routinely violates the posted speed limit. We have repeatedly witnessed the careless driver who goes through stop signs without first making a complete stop. We have even seen those who go through red lights in their eagerness to get to their destinations a few minutes earlier. Many drivers still do not wear seat belts and many more execute turns without bothering to indicate their intentions. All these vehicular law violations, and many more, would be noticeable and recordable by some embodiments of CVIS. Each event associated with a violation would be recorded at a central processing unit and would also be tagged with the registered identity of the vehicle involved, the time-of-day of occurrence, and position coordinates of occurrence.

2. Elements

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims.

An element of some embodiments of CVIS is the Transponder-Interrogator pair of FIG. 1. The Transponder resides in a vehicle and can thus be classified as a mobile device. The Interrogator may (or may not) reside in a vehicle and thus may (or may not) be a mobile device. Interrogators may be installed in law-enforcement vehicles (police and/or state trooper vehicles) but, in other embodiments, Interrogators may be installed in fixed locations, perhaps on top of light poles and traffic signs (on the sides of roads and highways), integrated with traffic lights at road intersections, situated close to stop signs, strategically located in and around school zones, and in many other places where vehicular law enforcement is of importance and concern.

As is illustrated in FIG. 1, an in-vehicle Transponder receives inputs from a plurality of vehicular sensors (via physical electromechanical connections and/or wirelessly). Inputs to the Transponder may be speed of the vehicle, left- and right-turn signal states, odometer reading, GPS receiver data, vehicular theft sensor indications, driver's seat belt state (on/off), etc. . . . Inputs to the Transponder may also arrive (wirelessly or otherwise) from a man-machine interface that may be used to pre-condition the Transponder to request certain information when in the proximity of certain Interrogators.[1] Permanently stored within a non-volatile memory of each Transponder, will be a unique identifier (ID) of the vehicle associated with that Transponder.

[1] The Transponder may request local-area commercial information such as, for example, the three closest (relative to its location) restaurants offering French cuisine, or the two closest cinemas with a current list of movies playing, etc. Such information may be provided as a public service to motorists by the Local/State transportation authorities over their corresponding Interrogator networks. The service can be free of charge to the commercial entities being promoted, or a nominal monthly fee may be charged.

Figure 10:
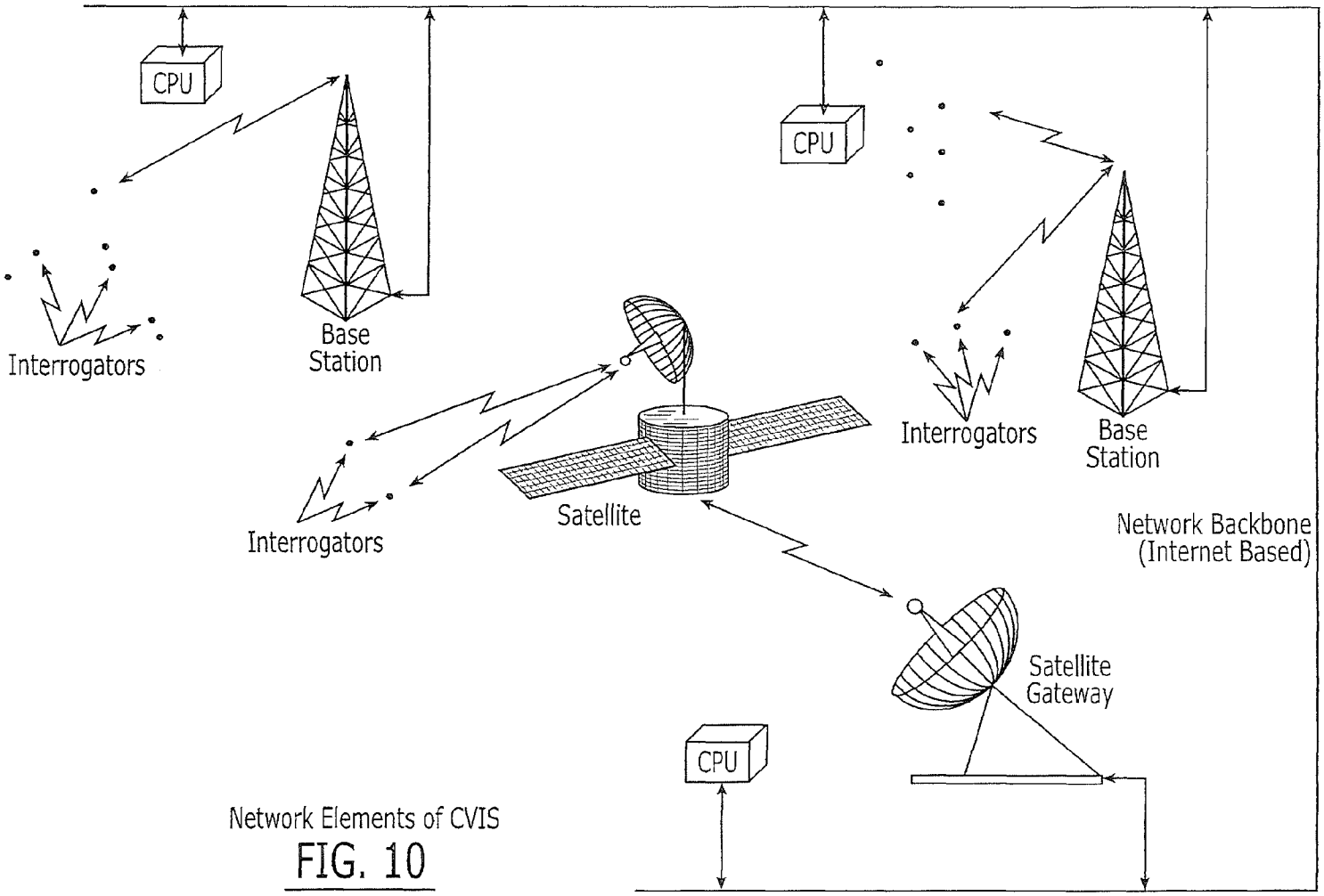
FIG. 10 is a block diagram of network interconnected systems and methods according to various embodiments of the present invention.

An Interrogator, as shown in FIG. 1, transmits and receives information to and from the Transponder. In addition, the Interrogator relays information to a centrally located processing unit (computing center) and is also capable of receiving information (from said processing unit and/or other sources). In some embodiments, the Interrogator transmits information to the Central Processing Unit (CPU) and receives information from the CPU or said other sources, in substantially real time, using, for example, a GSM packet-data protocol such as GPRS (or EDGE). Terrestrial cellular/PCS or satellite-based data/paging networks can be used to connect the Interrogator to its designated CPU[2]. Dedicated line-of-sight microwave links or other media such as wire or fiber-optical cable may also be used. See, for example, FIG. 10.

[2]A US-wide paging network may be used to provide urban and suburban connectivity between the plurality of Interrogators and their corresponding CPUs. Non-time-critical updates of Interrogators by the CPU and the transferring of non-time-critical data to the CPU from the field devices (Interrogators) may take place during off-peak hours of the day and night. In some embodiments, only time-critical updates should be scheduled to occur in substantially real time.

3. Monitoring of Vehicular Parameters

Two groups of embodiments that can be used to detect violations of vehicular law are described below. Following a reading of this section, it will be apparent to one of ordinary skill in the art that a number of combinations and variations on the embodiments discussed hereinbelow are possible. Even though this is recognized, we do not attempt to be exhaustive; rather, we chose to be comprehensive and thorough, focusing on two specific embodiments, so that the scope and spirit of the disclosure can be conveyed fully and unambiguously to one of ordinary skill in the art.

3.1 First Embodiments

The Independent Interrogator

In accordance with first embodiments (the independent Interrogator concept) Interrogators are positioned at predetermined locations, along the sides of highways and roads, and are configured to transmit an interrogation periodically, say once every 0.5 seconds.[3] Vehicle Transponders proximate to such Interrogators (i.e. within listening range) may be triggered to provide a response. Even when an interrogation is reliably received (error free) by a vehicle Transponder, said vehicle Transponder may or may-not be triggered to respond. In some embodiments, the decision to respond may depend on the type of interrogation message received, requesting a conditional or an unconditional response. In other embodiments, the decision of a Transponder to respond may also depend on whether or not said Transponder has already responded to the particular Interrogator, within a predetermined elapsed time interval. By suppressing subsequent Transponder responses to the same Interrogator (over a predetermined time interval) some embodiments of the invention may eliminate many redundant Transponder responses (that otherwise may be transmitted) thus reducing the probability of response collisions.

[3] In some embodiments, independent Interrogators of the type described in this section may also be installed in law-enforcement vehicles.

As has already been noted, an interrogation may request a conditional or an unconditional Transponder response. Subject to the conditional interrogation, the Transponder will respond if it is in violation of some aspect of the Law. For example, if the driver is not wearing his/her seat belt, and/or if the vehicle has not passed inspection within the time limit allowed, and/or if the speed limit is being violated. Furthermore, if the vehicle has been subjected to unauthorized usage (has been stolen, as determined by the vehicular sensors), and/or if the vehicle has been reported stolen,[4] a Transponder response will also be issued.

[4] How the vehicle knows that it has been stolen (other than detecting unauthorized usage with its own sensors) will be discussed later.

Figure 2:
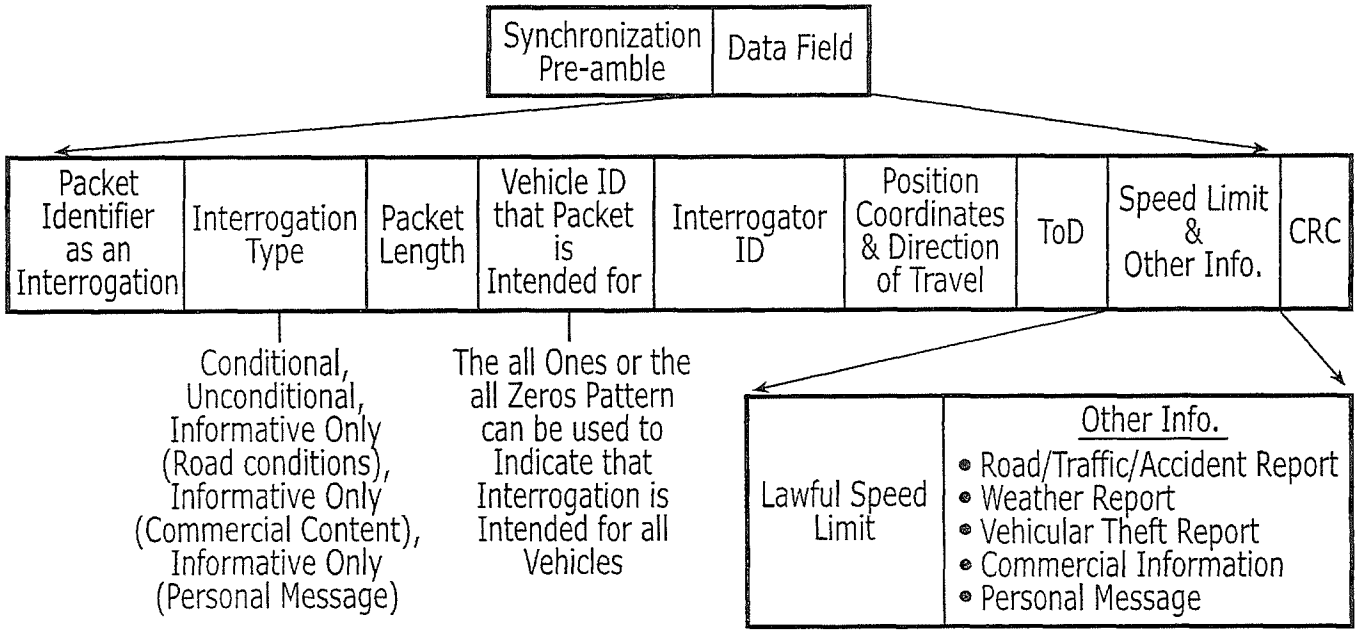
FIG. 2 schematically illustrates interrogator packets according to various embodiments of the present invention.

In some embodiments, each interrogation, whether it is of the conditional or unconditional type, relays a unique Interrogator identifier (ID), a measure of the physical coordinates of the Interrogator, the Time of Day (ToD), the lawful speed limit, and may also relay additional broadcast information that may be relevant to motorists proximate to the Interrogator site. FIG. 2 shows additional illustrative detail regarding an interrogation packet structure according to some embodiments of the invention. The Transponder reads the data contents of the interrogation, correlates said data (e.g. speed limit) with the actual data (e.g. speed of the vehicle as provided to the Transponder by the vehicular sensors; see FIG. 1) and decides whether a response to the received interrogation is warranted. A response to the received interrogation may be initiated based on either unacceptable (unlawful) vehicular sensor states and/or any other violation-of-the-law, or it may be based on some other condition such as the need for commercial information or a personal message to be delivered.

Figure 3:
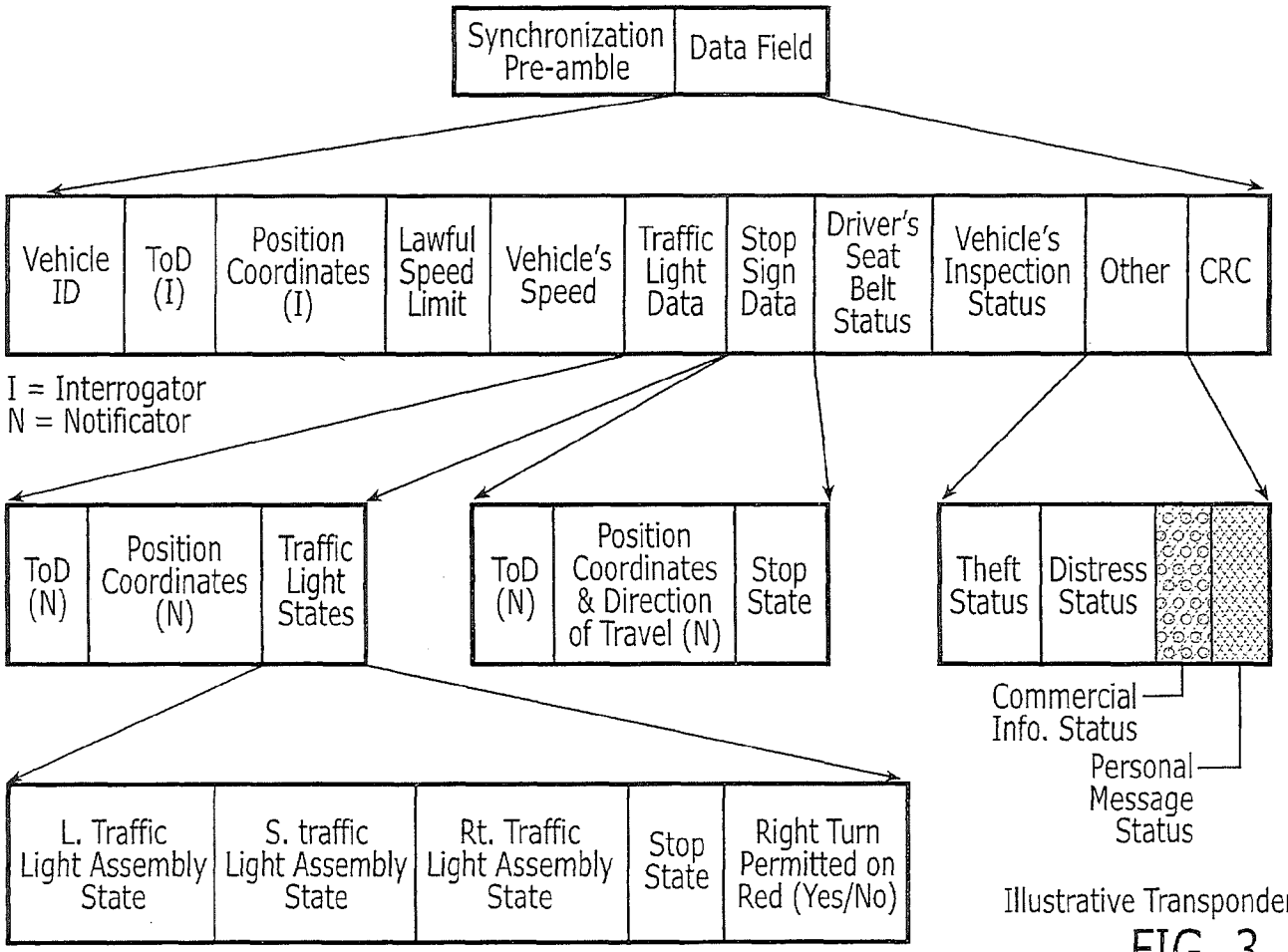
FIG. 3 schematically illustrates transponder packets according to various embodiments of the present invention.

In some embodiments, should the Transponder decide to respond, the response will include the vehicle's unique identification number, the ToD, position coordinates, the lawful speed limit (as relayed to the Transponder by the Interrogator); the vehicle's actual speed, red light & stop sign flag status (the significance of which will be discussed in detail later); the driver's seat belt status (ON/OFF); inspection status; theft status; and/or driver's distress status (see FIG. 3). The Transponder response may also contain an inquiry requesting from the Interrogator certain local-area information. The Transponder response may also indicate the presence of a message to be delivered (from the vehicle to some destination; see FIG. 3). The driver's distress status, when activated (either manually or by voice command) will serve to automatically notify the authorities that the vehicle is in distress. The authorities will be able to identify the distressed vehicle's location by the unique ID and position coordinates of the Interrogator relaying the distress message to the CPU. From that point on, some embodiments of CVIS could track the vehicle as it encounters successive Interrogator sites. There could even be specially marked areas, on the sides of roads and highways, equipped with Interrogators that include, for example, Bluetooth-based and/or other wireless audio/video means. Such Interrogators, when triggered by a vehicle's distress message could offer audio/video connectivity between said vehicle and the authorities. The Transponder may also be equipped with the appropriate audio/video interface.[5]

[5] The vehicle in distress also may need to pull over into such a specially marked area and stop in the proximity of the Interrogator to establish connectivity.

In other embodiments, if a Transponder decides to send a response to an interrogation because there is some aspect of the law that has been violated, the response will also be stored locally within the Transponder. In addition to keeping a local copy of its response, the Transponder may also store a digital image and/or other characteristic of the driver.[6] Given that the Transponder's response is received reliably by the Interrogator (as determined, for example, by a CRC field and/or other error checking) the Interrogator will copy said Transponder response in memory and will send a confirmation to the issuing Transponder (see FIG. 4). The Transponder, upon receipt of the confirmation, will store the data contents of its confirmed response in non-volatile memory as a "permanent record" of the violation event. All parameters in violation will be stored, together with the time-of-day, lawful speed limit, and position coordinates associated with the violation (the position coordinates associated with the violation, the time-of-day, and the lawful speed limit are those relayed to the Transponder by the Interrogator). As part of this permanent record, the digital image and/or said other characteristic of the driver will also be stored. From this time on, in some embodiments, the Transponder may ignore all subsequent interrogations that may be received from the same Interrogator over a predetermined time interval.

[6] Means of generating such an image may be provided as part of the overall Transponder instrumentation. Other means such as those that would "sniff" the in-vehicle air for alcohol content may also be provided.

In other embodiments, in the case of an unconditional interrogation, the vehicle is obliged to respond whether it is in violation of the law or not. No permanent record is kept by the Transponder (per the above discussion) unless the vehicle happens to be in violation of some aspect of the law. This mode of Transponder response, to the unconditional interrogation, may be used in places where the authorities desire to gather statistics on parameters such as the number of vehicles passing by a particular location at different times of the day, the distribution of speed at that location, the types of vehicles (private cars, taxis, trucks, etc.) passing by that location, etc. . . . As with the Transponder response to a conditional interrogation, here too, a confirmation by the Interrogator is sent to each responding Transponder in some embodiments. This may be done to silence the Transponder from responding to subsequent interrogations that may be received from the same Interrogator over a predetermined time interval.

3.2 The Concept of Notificators

Second Embodiments—The Dependent Interrogator

In accordance with second embodiments of the invention, the Interrogator does not transmit unless it is triggered by a near-by Transponder whose associated vehicle is in violation of some aspect of the law, or in distress, or needs to receive or transmit information. Some embodiments, may work as follows: Each road containing Interrogators also contains other devices referred to as Notificators. A Notificator is a transmit-only device that relays information to near-by (passing-by) vehicles. The Notificator does not receive information from vehicles, only transmits to them. In some embodiments, the Notificator, however, can be configured to communicate bi-directionally with the CPU. The Notificator will periodically transmit its coordinates, ToD, and the lawful (posted) speed limit for its location, and may also be enabled to transmit other information such as road conditions, traffic reports, accident reports, weather bulletins, etc. In other embodiments, the Notificator may also be configured to transmit a "you have been stolen" message which would be aimed at specific vehicles that have been reported stolen.[7]

[7] Imagine a very sophisticated thief who manages to steal a vehicle without triggering any of the unauthorized use (theft) sensors of the vehicle. When the owner of said stolen vehicle becomes aware of the fact and notifies the authorities, the authorities can command all Notificators in the area (via the CPU) to start transmitting the "you have been stolen" message, accompanied by the stolen vehicle's unique ID. When the stolen vehicle's Transponder receives the notification, it will identify itself as stolen at the next Interrogator site (together with position coordinates) thus notifying the authorities of its whereabouts.

We return now to describe how Interrogators may be triggered to interrogate in accordance with some embodiments of the invention. When a Transponder has received information from a Notificator and said Transponder decides that, based on the received information, it is engaged in some unlawful activity, the Transponder begins to periodically broadcast a message. The Transponder broadcasts (at say frequency $f_i$) its unique vehicle ID and the Notificator's coordinates, pseudo-randomly changing the carrier frequency $f_i$ from broadcast to broadcast. The Transponder broadcasts and then listens; broadcasts and then listens; in a time division duplex fashion, both broadcasting and listening at $f_i$. Each Interrogator listens to all possible Transponder broadcast frequencies $f_i$ (i=1, 2, . . . , L−1, L). Hence, when an Interrogator hears a Transponder's broadcast, the Interrogator responds by interrogating the specific Transponder whose broadcast it has just heard. The interrogation is transmitted at carrier frequency $f_i$, while the Transponder is still listening at $f_i$.

Embodiments of an Interrogator packet format are illustrated in FIG. 2. Embodiments of the Transponder response are illustrated in FIG. 3. Embodiments of the confirmation by the Interrogator to the Transponder are shown in FIG. 4. In some embodiments, all this exchange occurs at the same frequency $f_i$; the frequency at which the Interrogator was triggered by the Transponder to interrogate. This, however, need not be the case. For example, the Interrogator, having been triggered to interrogate at $f_i$, could include in its interrogation a command instructing the Transponder to reply at $f_j$ ($f_i \neq f_j$). Alternatively, the Interrogator can be told, via the broadcast message that triggers it, to interrogate at $f_k$ ($f_k \neq f_i \neq f_j$) etc. When the above exchange of information between Transponder and Interrogator is complete (as indicated by the confirmation to the Transponder by the Interrogator) the Transponder ceases all further transmissions of its broadcast until it is once again triggered by some other Notificator. In some embodiments, the Transponder broadcasts will not cease, however, if they are caused by a vehicle theft condition. If the Transponder's broadcasts relate to a stolen vehicle state, the broadcasts will continue to facilitate vehicle tracking as said vehicle travels from Interrogator site to Interrogator site.

According to some embodiments, one reason for including the Notificator's coordinates in the Transponder's broadcast message, is to reduce or preclude the possibility of having vehicles wrongly accused of violating the speed limit. One can imagine, for example, a vehicle on a highway violating the speed limit by going 75 mph while the posted speed limit is 55 mph. Let's assume that said vehicle is broadcasting, and imagine a location where the highway and a city road come very close together. Furthermore, let's assume that, due to an engineering oversight or other reason, an Interrogator situated on the city road (at the point where the city road and the highway come close to each other) can hear broadcasts of vehicle Transponders traveling on the highway. By deciphering the broadcast message, and reading the Notificator's coordinates, the road Interrogator can ignore all highway vehicle broadcasts (even though some aspect of the law has been violated) since the Notificator's coordinates make it clear that said broadcasts relate to vehicles on an other road/highway and, hence, will be handled by Interrogators on said other road/highway. Similarly, if due to some improper installation/calibration of a Notificator or other reason, its radiated signals are heard by Transponders on roads/highways other than the intended one, Interrogators on said "other than the intended one" route will ignore any broadcasts initiated by said Transponders. Failure to correlate between the Notificator's "coordinates", as relayed by the Transponder's broadcast, and those of the listening Interrogator, can inhibit triggering the Interrogator to interrogate[8].

[8] It should be understood that the term "coordinates" is used throughout this document in a very liberal sense. In some embodiments, the term coordinates is not used with geometrical rigor to specify a precise point in space; rather, it is used to specify a particular road/highway and in some cases a specific location on said road/highway (e.g. route 495 between exits 50 and 51). It is envisaged that Notificators and Interrogators belonging to the same road/highway will be positioned close to each other (may even be co-located, or even physically integrated onto one assembly). As such, the "coordinates" relayed by a Transponder broadcast should always correlate, at least with regard to the specified road/highway, with the coordinates of an Interrogator hearing the broadcast. In other embodiments, precise geometrical coordinates may be used.

In some embodiments, Notificators frequency-hop from one notification message to the next in order to comply with regulatory requirements of the unlicensed-frequency Instrumentation, Scientific and Medical (ISM) band. Each notification message is repeated at each transponder listening frequency $f_i$; i=1, 2, . . . , L. Preferably, the L repeats of each notification should occur over a short period of time (e.g., within 500 ms or less). In some embodiments, transponders do not have any timing or frequency-hop pattern information relative to Notificators. A Transponder simply tunes its receiver to a frequency, randomly selected from the set $\{f_i$; i=1, 2, . . . , L$\}$, and listens. FIG. 5a illustrates how the frame format for a Notificator packet may be configured. As can be seen from the Figure, the notification packet relays ToD, position coordinates, lawful speed limit information, as well as road conditions information. The road conditions information may be anything that the authorities deem important for motorists such as accident reports, congestion reports, slippery road conditions, weather reports, etc. . . . In addition to the above, the notification packet may also contain stolen vehicle information. As shown on FIG. 5a, up to J stolen vehicle IDs may be broadcast. In some embodiments, what limits the value of J is the constraint that within 500 msec (or so) the Notificator is able to repeat the notification packet L times. Hence, when the stolen vehicles list exceeds the limits set forth by the above requirement, a longer notification message may be created spanning several hops. Each frequency-hopped notification message segment can reveal the next hop frequency at which the message is to be continued (see FIG. 5b) so that the Transponder can follow the hopping pattern of the Notificator. Thus, the Transponder may be able to read the entire stolen vehicles list.[9] However, there is one additional issue regarding relatively long Notificator messages: The vehicle may need to be moving relatively slowly or be stationary in order to hear the entire message. If the vehicle is in relative fast motion, it may find itself out-of-range of the Notificator before the entire message has been transmitted. This issue is the topic of the next section.

[9] Alternative embodiments use a Direct Sequence, Spread-Spectrum Notificator mode, and a corresponding Transponder receiver demodulator, so that relatively long Notificator messages can be transmitted over a predetermined (non-frequency-hopped) channel.

3.2.1 Special Purpose Notificators at Stop Lights

Special Purpose Notificators may be strategically positioned in the proximity of traffic lights. Such Notificators may contain lists of reported stolen vehicles (as relayed to them by the CPU) and may broadcast such lists periodically. The placement of Notificators in the proximity of traffic lights can offer advantages to the system. As a traffic light turns red, most vehicles (even those in the possession of thieves) stop. The (relatively long) time interval over which vehicles remain stationary at traffic lights allows the Notificator to transmit a significantly longer stolen vehicles list than it could otherwise be able to. As a result, the probability that a stolen vehicle will hear the message "you have been stolen", as relayed to it, for example, via a broadcast of its unique vehicle ID, is increased. Once a stolen vehicle receives the notification that it has been stolen, its "theft status" flag is raised, thus triggering the vehicle to start broadcasting, as already discussed, in accordance with the second embodiments.

The frame format configuration for this relatively long message may be as shown on FIG. 5b. The entire message may include many segments similar to the one illustrated on FIG. 5b. Each message segment may be identical in form to the previous one but this is not necessary. For example, in some embodiments, the ToD and position coordinates may be omitted following the first message segment, but if a vehicle starts listening to the message after the first segment, that vehicle would be in the dark regarding ToD and position (unless of course it waited long-enough to hear the beginning of the message). Another alternative embodiment may include ToD and position coordinates intermittently, say once every 10 message segments.

At the beginning of the "stolen vehicles list" notification message and intermittently thereafter, the message segment may be repeated on all Transponder listening frequencies in order to get all proximate Transponders to track the message (to follow the frequency-hopping pattern)[10]. By doing so, all Transponders in the vicinity of the Special Purpose Notificator can receive a message segment which reveals the value of the next hop frequency at which the message is to be continued.

[10] As will be described later, when the Special Purpose Notificator is co-located with Traffic Light State Notificators, this may not be necessary.

4. Time-Frequency Plan

First Embodiments

Figure 6:
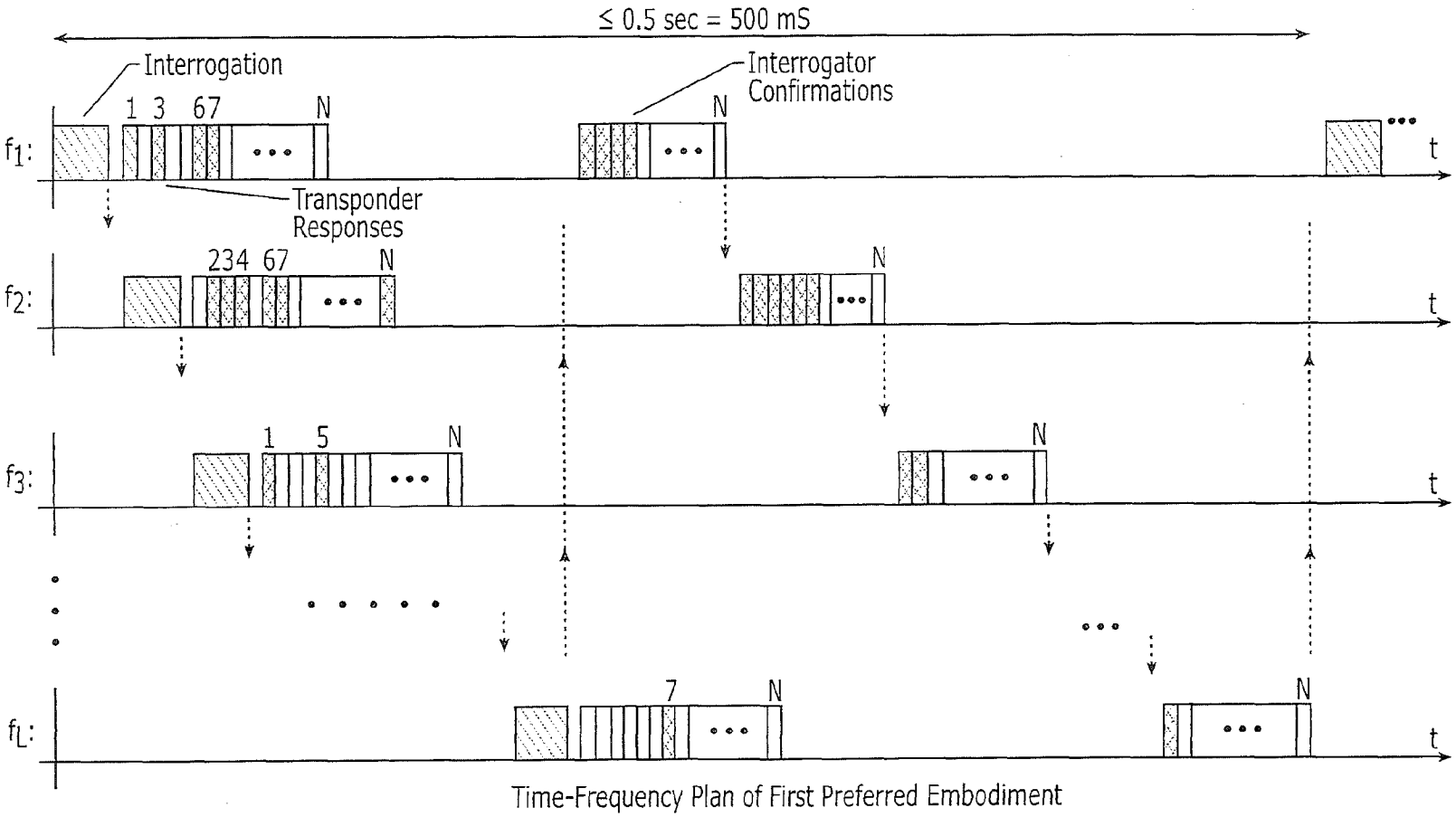
FIG. 6 is a timing diagram illustrating time-frequency plans according to various embodiments of the present invention.

In some embodiments, an Interrogator sequentially transmits its interrogation on all possible frequencies ($f_1$ through $f_L$) that Transponders may be listening to. FIG. 6 illustrates a time-frequency plan according to some embodiments. The entire interrogation packet (as illustrated on FIG. 2) is first transmitted on $f_1$, followed by retransmission on $f_2$, then on $f_3$, and continuing on until the same interrogation packet has been transmitted on all Transponder listening frequencies. Each Transponder randomly selects a frequency to listen to from the a priori stored set $\{f_1$ through $f_L\}$. When a Transponder receives the interrogation packet and decides to respond (either based on some violation of the law criterion, a distress state, or because the interrogation is of the unconditional type, etc.) the Transponder randomly selects one out of the N available time slots (see FIG. 6) within which to send its response. In some embodiments, N is a number between 16 and 32. Generally, the larger N is, the smaller the probability becomes that responses will collide. For example, assume 100 vehicles near an Interrogator, able to detect interrogations, and say that 10 of these are in violation of the law. Furthermore, assume that the Transponders of these 100 vehicles are uniformly distributed over the listening frequency set. With N orthogonal time slots per listening frequency, the probability of a response collision is 10/LN. With L=20 and N=16, the probability of a Transponder response collision becomes $(10/320)=1/32$, for this example. Setting N=32, makes the above probability become $1/64$. In the event of a collision, the Interrogator will (most likely) not recognize any response (over the time slot where the collision occurred) and will, therefore, not transmit a confirmation. Thus, the Transponders involved in the collision will continue to respond to subsequent interrogations.

In some embodiments, all Transponder responses that are received error free by the relevant Interrogator are acknowledged via a confirmation to the issuing Transponder. As illustrated on FIG. 6, there are four Transponder responses over frequency $f_1$, on time slots 1, 3, 6, and 7, respectively. Following the last interrogation repeat (at frequency $f_L$) the Interrogator goes back to $f_1$ to acknowledge the four received Transponder responses. Then, the Interrogator jumps to $f_2$ to acknowledge the six Transponder responses there. Following $f_2$, $f_3$ is served, and so-on, all the way down to $f_L$. In serving acknowledgements on any one of the frequencies $f_i$ ($1 \leq i \leq L$) the Interrogator stays on $f_i$ for a length of time equal to what would be needed if the Interrogator had to serve N acknowledgements, even though less than N acknowledgements will typically be required. After this length of time, the Interrogator moves on to $f_{i+1}$ to serve the acknowledgements there, and stays on $f_{i+1}$ for a length of time equal to the maximum that would be required for the Interrogator to serve the maximum of N confirmations.[11] These embodiments can maintain invariant time-line relationships between events occurring over the plurality of frequencies $f_1$ through $f_L$. Other embodiments, however, are possible where the Interrogator serves the acknowledgements at a given frequency immediately following the received Transponder responds at that frequency. Following the last set of acknowledgements at frequency $f_L$, the Interrogator returns to $f_1$ and the process starts all over again with the Interrogator issuing its interrogation sequentially over the entire frequency set[12].

[11] The terms confirmation and acknowledgement are being used interchangeably.

[12] It may be desirable for the period of the process to be confined to 500 msec. In some embodiments, this can assure that even when traveling at relatively high speeds, vehicles will have ample time to hear and respond to interrogations. The 500 msec target can be met by a system whose over-the-air transmission rate is about 1 Mbps or more. Preliminary calculations regarding packet lengths indicate that the interrogation packet can be bounded by about 5,800 bits before Forward Error Coding (FEC) resulting in about a 10,000-bit packet after FEC is applied. The Transponder packet is bounded by about 810 bits (before FEC) resulting in about a 2,000-bit packet following FEC overhead. Note that the frequencies $f_1, f_2, \ldots, f_L$ need not represent contiguous values or values that are monotonically increasing. Furthermore, the Time Division Duplex Multiplexing (TDDM) approach, regarding the Interrogator/Transponder exchange, as discussed above and illustrated on FIG. 6, may be replaced with a Code Division Multiplexing (CDM) methodology where instead of time, code orthogonality is relied upon to separate Transponder responses at the Interrogator receiver. Still further embodiments use Frequency Division Multiplexing (FDM) whereby frequency orthogonality is used in lieu of either TDDM or CDM. In addition to the above, other combinations and/or variations of multiplexing schemes as well as other time-frequency relationships that are within the scope and spirit of what has been disclosed hereinabove, will occur to those skilled in the art. For example, in accordance with the TDDM approach of FIG. 6, instead of waiting for all Transponder responses (at a given $f_i$) to first arrive at the Interrogator before transmitting confirmations, embodiments whereby acknowledgements (confirmations) are transmitted by the Interrogator immediately following the receipt of a Transponder's response may be implemented.

5. Time-Frequency Plan

Second Embodiments

Figure 7:
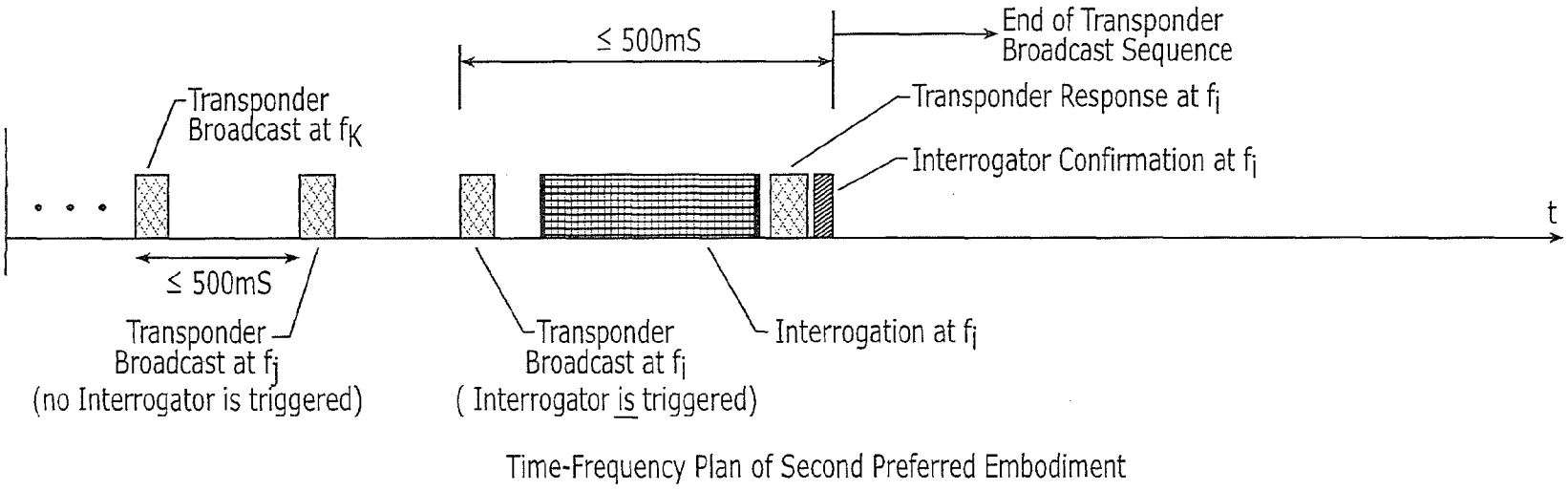
FIG. 7 is a timing diagram illustrating time-frequency plans according to various other embodiments of the present invention.

As has been stated earlier, in accordance with the second embodiments, shortly after a Transponder is triggered by a Notificator to start broadcasting, said Transponder pseudo-randomly selects a frequency from the set $\{f_i; i=1, 2, \ldots, L\}$ and begins to transmit identifying information over said frequency. The Transponder broadcast burst is transmitted periodically (for example, once every 500 msec) until an Interrogator is triggered to interrogate. As illustrated in FIG. 7, when an Interrogator is triggered, the Interrogator/Transponder exchange followed by the Interrogator confirmation takes place, at the end of which the Transponder's periodic broadcast sequence may end. FIG. 7 illustrates a time lag between the Transponder broadcast that triggers the Interrogator and the interrogation itself. This is intended to illustrate that the Interrogator may be busy serving other broadcasts and/or is busy with other time-critical functions.

6. Transponder Options for Changing Transmit and Receive Frequencies

In accordance with the second embodiments, it has already been stated that the Transponder, once triggered to start broadcasting, pseudo-randomly (and in some embodiments, uniformly and with no bias over the available frequency set) changes transmit/receive frequency once per broadcast interval (at least once about every 500 msec). When the Transponder is not in the broadcast mode, it randomly (and in some embodiments uniformly) selects a frequency from the set $\{f_i; i=1, 2, \ldots, L\}$ to listen to. The Transponder stays at the chosen frequency, and continues to listen for Notificator messages until a Notificator message and some violation of the law and/or a distress state and/or the Transponder's desire to transmit or receive information, triggers said Transponder once again into the broadcast mode.

In accordance with the first embodiments, each Transponder can be configured so that in response to each received interrogation confirmation message the Transponder hops pseudo-randomly (and preferably uniformly) to a new frequency $f_i$. Consequently, even if all Transponders at the time of manufacturing and/or installation are initialized to a common receive/transmit frequency $f_0$, $\ni: f_0 \in \{f_1, f_2, \ldots, f_L\}$, offenders would soon be randomized. Alternative embodiments may entail assigning, in a pseudo-random fashion, at the time of manufacturing and/or installation, a receive/transmit frequency to each Transponder, which the Transponder then maintains ad infinitum. Variations of the two embodiments may also be used.

7. The Traffic Light Notificator Set

We have already described how embodiments of CVIS may be used to identify and record various driving violations such as exceeding of the speed limit, the driver not having engaged the seat belt mechanism, operating a vehicle with expired inspection status, driving a stolen vehicle, etc. We have also described how embodiments of CVIS can serve as a safety net for drivers in distress and how embodiments of CVIS can provide other services and information to motorists. In this section, we describe other embodiments of CVIS—the ability of embodiments of CVIS to detect traffic light and stop sign violations. Not honoring a traffic light (i.e., not stopping at a red light) may be one of the most dangerous behavior patterns that a driver can engage in.

Figure 8:
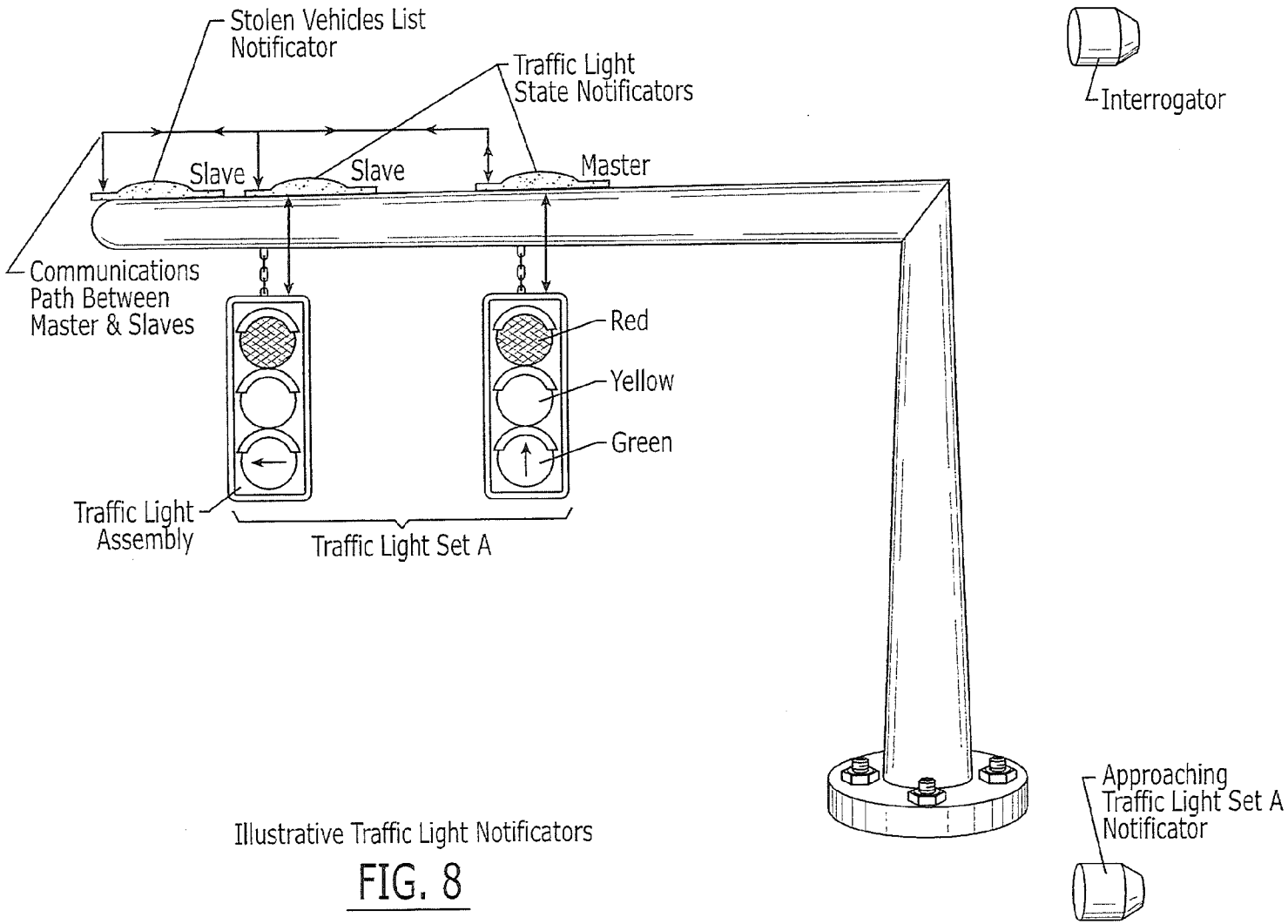
FIG. 8 illustrates traffic light notificators according to various embodiments of the present invention.

FIG. 8 illustrates a set of traffic lights at an intersection according to some embodiments of the invention. The Traffic Light Set shown on FIG. 8 is labeled as "Traffic Light Set A" to distinguish it from other possible Traffic Light Sets that may exist at the same intersection. Typically, up to four Traffic Light Sets may exist at an intersection. Also shown on FIG. 8 is an "Approaching Traffic Light Set A Notificator". This Approaching Traffic Light Set A Notificator is strategically located such that vehicles traveling towards Traffic Light Set A will first encounter said Approaching Traffic Light Set A Notificator. After a vehicle has traveled beyond Traffic Light Set A, whether it has continued straight-ahead or has made a turn (left or right) the vehicle will encounter an Interrogator. Only one such Interrogator is shown on FIG. 8 (the one that will be encountered should the vehicle decide to continue straight-ahead beyond the Traffic Light Set A). Thus, a Traffic Light Set that is equipped with Traffic Light State Notificators and/or with a Stolen Vehicles List Notificator, will (from the point of view of an approaching vehicle) be preceded by an Approaching Traffic Light Set Notificator and will be followed by an Interrogator, irrespective of the direction of said vehicle beyond said Traffic Light Set.

FIG. 8 also illustrates that each individual Traffic Light Assembly (responsible for managing traffic in some specific direction; straight ahead, left, or right) may have associated with it a Traffic Light State Notificator according to some embodiments of the invention. Information from each Traffic Light Assembly is sent (via physical connection or wirelessly) to the corresponding Traffic Light State Notificator. Information may also be transmitted from the one Traffic Light State Notificator designated as the Master, to the other Traffic Light State Notificator(s) that are associated with the same Traffic Light Set and are designated as Slave(s). Information from the Master may also be transmitted to the Stolen Vehicles List Notificator associated with the same Traffic Light Set (also designated as a Slave on FIG. 8). In, general, information may flow bi-directionally throughout the chain of Traffic Light Set Notificators, from any Notificator to any other, as shown on FIG. 8. Information may also flow from a Notificator that is associated with a particular Traffic Light Set to at least one Traffic Light Assembly associated with said Traffic Light Set.

Figure 9:
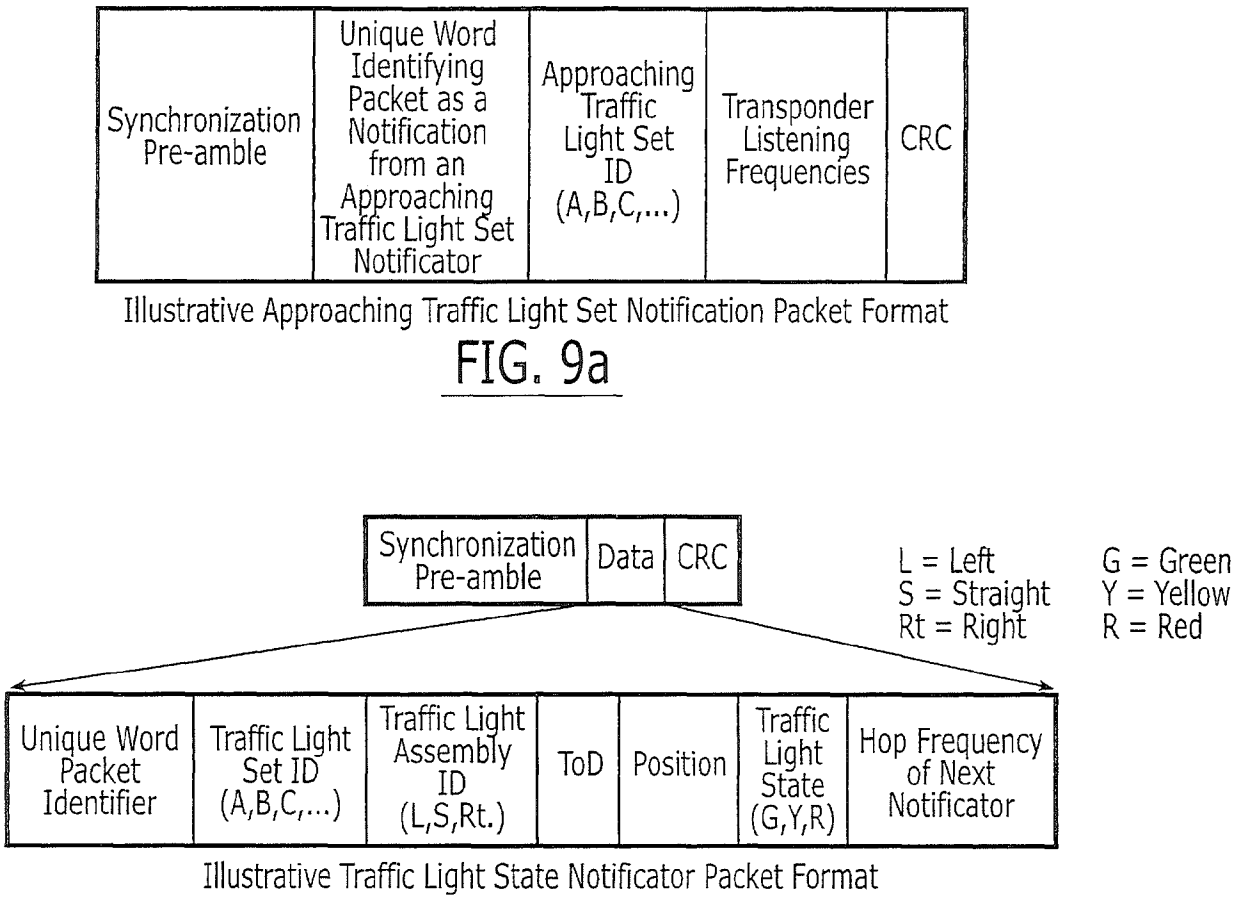
FIGS. 9A and 9B, which together form FIG. 9, schematically illustrate traffic light notificator packet formats according to various embodiments of the present invention.

As noted earlier, according to some embodiments of the present invention, a vehicle approaching Traffic Light Set A will first encounter the Approaching Traffic Light Set A Notificator. The Approaching Traffic Light Set A Notificator informs the vehicle that it is about to enter the listening range of a possible plurality of Traffic Light Sets, but it is only to listen and pay attention to transmissions (notifications) originating from Notificators of Traffic Light Set A. The Approaching Traffic Light Set A Notificator also informs the vehicle of the Transponder listening frequencies corresponding to Traffic Light Set A (chosen so as to maintain orthogonality between the transmissions of the plurality of Notificator sets corresponding to a plurality of Traffic Light Sets that may be proximate at an intersection). The Approaching Traffic Light Set A Notificator transmits its notification periodically (say once every 500 msec) repeating said notification on all Transponder listening frequencies within the repetition interval (within the 500 msec). An illustrative packet format for the Approaching Traffic Light Set Notificator is shown in FIG. 9a.

In some embodiments, each Traffic Light State Notificator periodically transmits a notification informing Transponders of its associated Traffic Light Assembly state. The Traffic Light State Notificator receives information regarding the state of its corresponding Traffic Light Assembly, for example, from the corresponding Traffic Light Assembly itself (see FIG. 8). As with all Notificators, the Traffic Light State Notificator will repeat its notification on all Transponder listening frequencies (within a predetermined time interval) so that all vehicle Transponders within listening range can be notified. An illustrative packet format for the Traffic Light State Notificator is shown in FIG. 9b. An intercepting Transponder first correlates the information that it has received from the Approaching Traffic Light Set Notificator with the Traffic Light Set ID field in the Traffic Light State Notificator packet. If a match is found, the Transponder copies the Traffic Light Assembly ID, ToD, position coordinates, and traffic light state fields found within the Traffic Light State Notificator packet. The Transponder will keep separate records of traffic light state notifications corresponding to different Traffic Light Assembly IDs. These separate records will be updated in ToD and Traffic Light State as new notifications with correlating Traffic Light Assembly IDs arrive with new parameters in said corresponding ToD and Traffic Light State fields.

Frequency coordination between the Stolen Vehicles List Notificator and the Traffic Light State Notificator(s) associated with a particular Traffic Light Set, such as the Traffic Light Set shown on FIG. 8 now will be described according to some embodiments of the invention. Some embodiments of the invention may avoid collisions between the transmissions of the plurality of Notificators that may be associated with the plurality of Traffic Light Sets that may be situated at a given intersection. This may be accomplished as follows: At each intersection, each Traffic Light Set (A, B, C, D) may be assigned a different orthogonal subset of frequencies for its corresponding Notificators to use. Thus, upon notification by the Approaching Traffic Light Set Notificator, a Transponder may select a frequency from said assigned subset of frequencies to listen to while ignoring all other frequencies that may be associated with other proximate Traffic Light Sets. This can guarantee frequency orthogonality between the emissions of a plurality of Notificators corresponding to a plurality of Traffic Light Sets that may be situated in close proximity at an intersection, and can allow the plurality of Notificators corresponding to different proximate Traffic light Sets to operate independent of each other, without the need for synchronization, while still avoiding collisions.

In accordance with some embodiments of the invention as illustrated in FIG. 8, one Traffic Light State Notificator per Traffic Light Set may be designated as a "Master". The Master may transmit its notification pseudo-randomly over the entire designated frequency sub-band while keeping all other Notificators inhibited. When the Master has delivered its notification over all associated frequencies (thus capturing all proximate Transponders) the Master then sequentially activates the other Traffic Light State Notificators, designated as Slaves, to deliver their notifications at frequencies that have been pseudo-randomly chosen by the Master. In some embodiments, the Master, besides dictating the hop frequencies of the Slaves, transmits via its notification to the Transponders the frequency to be transmitted by the next-in-line Notificator. Each Slave Notificator via its notification packet also informs the Transponders regarding the frequency to be used by the next-in-line Slave Notificator. Thus, in some embodiments, the Master Notificator is the only Traffic Light Set Notificator that needs to perform "capturing" of Transponders by repeating the notification on all frequencies. The above time-frequency coordination embodiments, besides avoiding collisions between the transmissions of the plurality of Notificators that may be associated with a given Traffic Light Set, may also "capture" Transponders (following the first "hit" by the Master) so that notifications may be heard, thereafter, by such captured Transponders on first transmission.

In some embodiments, the Interrogators following a Traffic Light Set can be of either type—Independent or Dependent. First, assume that Interrogators of the Independent type follow Traffic Light Sets. If a vehicle travels straight-ahead past a Traffic Light Set, and upon interrogation presents a Red Traffic Light State response (within the Traffic Light Assembly S field; see FIG. 3) then that vehicle is identified as having violated the straight-ahead stop light signal. If a vehicle makes a left turn following the Traffic Light Set and upon interrogation presents a Red Traffic Light State response (within the Traffic Light Assembly L field; see FIG. 3) then that vehicle is identified as having violated the left-turn stop light signal. If a vehicle makes a right turn following the Traffic Light Set, and there is no specific right turn Traffic Light Assembly (as is quite often the case) the Interrogator will look for either a Green Traffic Light State within the Traffic Light Assembly S field, or a full stop indication and Right Turn Permitted on Red validation[13]. The "Right Turn Permitted on Red" state (either YES or NO) may be provided by either the Traffic Light State Notificator associated with the right-turn Traffic Light Assembly (if present) or by another Traffic Light State Notificator belonging to the same Traffic Light Set.

[13] In some embodiments, in establishing the severity of a violation when a turn is involved, the right- or left-turn blinker state may also be examined by the Interrogator. That is, having made a legal left turn but without having indicated your intention to do so, is a small (relatively speaking) violation. However, the driver's profile may be updated, even in response to minor violations, and the driver's long-term record may thus be established. This type of data may be an input for insurance companies in setting rates for individuals.

In accordance with the second embodiments, and in addition to all other embodiments already discussed with respect to said second embodiments, Transponders may be configured such as a non-zero vehicular velocity in conjunction with straight-ahead motion and a Red Traffic Light State from a corresponding (straight-ahead) Traffic Light Assembly will trigger Transponder broadcasts. Transponders may also be configured so that vehicular motion in conjunction with having made a left turn and a Red Traffic Light State from the corresponding left turn Traffic Light Assembly will also trigger Transponder broadcasts, etc. . . .

The notion of having associated a Traffic Light State Notificator with each Traffic Light Assembly (see FIG. 8) raises the prospect of adaptive optimal traffic control, according to some embodiments of the invention. In response to the "state" of traffic (i.e., volume and average speed of traffic moving in a certain direction) the CPU may send Traffic Light Assembly control commands to certain select Traffic State Notificators. As is illustrated on FIG. 8, the bi-directional signal path between a Traffic Light State Notificator and the associated Traffic Light Assembly may be used to relay the information received by the Traffic Light State Notificator from the CPU to the corresponding Traffic Light Assembly. Said information may change, for example, the time intervals that the Traffic Light Assembly spends on Green and Red. As such, traffic flow may be altered.

In some embodiments, the CPU may ascertain, in substantially real time, the current traffic state (over a geographic area) from a plurality of Interrogators. In response to the current traffic state, the desired traffic state, and the state of a plurality of Traffic Light Assemblies, the CPU may execute an optimization algorithm (e.g., Kalman-based) to determine the optimum set of parameters for said plurality of Traffic Light Assemblies so as to optimally bring about the desired traffic state. Optimal and (nearly) real-time adaptive feedback control of the traffic state may thus be performed by the CPU.

8. The Stop Sign Notificator

In accordance with these embodiments, a Transponder is notified by a Notificator that it is approaching a stop sign (or that it has just passed by a stop sign). As such, the vehicle associated with the notified Transponder is expected to execute (or to have executed) a complete stop at the stop sign. Thus, in response to such a notification, the vehicle's velocity is examined over a time interval ($\pm\tau$) about the notification. If a zero velocity reading is found, the vehicle has obeyed the letter of the Law and has stopped at the stop sign; if not, the vehicle is in violation. If the vehicle has not made a complete stop, other questions such as did the vehicle slow down, and if yes by how much, may be asked.

9. The "HHTL" and the "HHTR"

The Hand-Held Transponder Loader (HHTL) and the Hand-Held Transponder Retriever (HHTR) are devices that input and output, respectively, information to/from the Transponder according to some embodiments of the present invention. The exchange of information between a HHTL and a Transponder or a HHTR and a Transponder preferably takes place wirelessly. The HHTL may be, for example, used by an Inspection Station to update the contents of a particular Transponder following an inspection of the vehicle associated with said Transponder. The HHTL may also be used to load into a Transponder a plurality of images, each reflecting characteristics of an authorized driver, so that in the event of a violation, correlations between the driver's "image" and the a priori stored images may be performed locally (within the Transponder). These embodiments can reduce or minimize the amount of data that would need to be relayed to the CPU. The HHTL may also be used by the Motor Vehicles Department to periodically load data into Transponders.

In some embodiments, the HHTR may be a portable device that may be used to (wirelessly) extract the records of drivers from Transponders. Law enforcement officials and insurance company agents, for example, may be users of HHTRs. The HHTR may also be equipped with means to delete Transponder records in response to specific input instruction.

10. Other Embodiments

10.1 Ensembles of Shipping Containers/Transportable Vehicles

According to other embodiments of the invention, shipping containers, or any other ensemble of transportable vehicles, may be equipped with Transponders. Each Transponder may be configured to accept inputs from one or more sensors of a container/transportable vehicle unit, relating to, for example, the contents of the container/transportable vehicle unit, its environmental state, whether the unit has been opened (and when) since it left a particular origin, etc. . . . , and may keep a record of such sensory inputs. At a particular destination (a loading/unloading dock) an Interrogator may be used to survey the ensemble of such container/transportable vehicle units.

In order to conserve battery life (if the Transponder of a container/transportable vehicle unit is operating on battery power) the Transponder may be configured to have a sleep mode whereby it may, for example, sleep for 1 sec., and then wake-up to listen and take sensor readings for 10 msec. If during the listening interval the Transponder detects a "presence signal" of an Interrogator, the Transponder may remain awake in order to read the interrogation message content and respond with unique identifying information. The Transponder may also relay to the Interrogator the contents of its record (a measure of its sensory inputs). Following the Transponder's response to the interrogation, and following a confirmation of reception sent to the Transponder by the Interrogator, the Transponder may return to its sleep mode cycle (i.e., sleeping for 1 sec. and awaking-up for 10 msec. to listen and take sensor readings). Any subsequent detections of the Interrogator's presence signal by the Transponder may be ignored by a Transponder that has already responded and has received confirmation that its response has been received. The time interval for which the subsequent detections of the Interrogator's presence signal may be ignored (by a Transponder that has responded and has received confirmation) may be a priori determined and stored within the Transponder, may be chosen by the Transponder, or may be dictated by the Interrogator's interrogation message. The Interrogator's presence signal may be a direct-sequence-spread and/or frequency-hopping waveform (or even a simple CW) whose parameter values are a priori known to the Transponder. Thus, each time the Transponder wakes-up, acquisition of the Interrogator's presence signal is attempted. If the presence signal is acquired, the Transponder remains awake in order to receive and process an Interrogation.

To reduce or minimize the probability of Transponder response collisions (particularly in areas where there may be a large ensemble of container/transportable vehicle units equipped with Transponders) the Interrogator may selectively command (via the interrogation message) a subset of the ensemble of container/transportable vehicle unit Transponders to respond. Thus, sequentially, subset-by-subset, the entire ensemble of Transponders may be interrogated to respond.

An ensemble of container/transportable vehicle units that may be en-route (on a barge, railroad cart, airplane, or a truck) may also be subject to the same interrogation process described above. In this case, however, a special purpose Interrogator device may be used. The special purpose Interrogator device may be permanently installed on the barge, railroad cart, airplane, or truck. The special purpose Interrogator device may contain an Interrogator (as specified above) in conjunction with a Transponder. The Interrogator component of the special purpose Interrogator device may be configured to interrogate the ensemble of container/transportable vehicle units, as described earlier, and thus gather a summary of their state. This summary may then be relayed to the Transponder component of the special purpose Interrogator device. Thus, as the barge, railroad cart, airplane, or truck that is transporting the ensemble of container/transportable vehicle units passes by an Interrogator (of the type that has been described for usage on the side of roads and/or highways) information reflecting the state of the container/transportable vehicle units ensemble that is en-route may be relayed to a CVIS CPU. The ability to interrogate and ascertain the state of the container/transportable vehicle units ensemble, as it travels from a point of origin to a point of destination, may offer significant Home Land Security benefits.

10.2 Activation/De-Activation of CVIS

In some embodiments of the invention, every vehicle may be CVIS equipped (may have a built-in Transponder). However, in other embodiments, not every vehicle's Transponder may be activated. A vehicle's Transponder may be activated voluntarily by the owner of the vehicle or, in the event that it isn't, a vehicle's Transponder may be activated by a Government authority. For example, an automobile insurance company may offer an insurance premium discount with CVIS activation of a vehicle. Thus, some people may choose to have their vehicles CVIS activated. A vehicle that is not CVIS activated and is involved in a number of accidents/traffic violations, may be ordered by the authorities to become CVIS activated.

CVIS may be activated in a vehicle in response to an interrogation message. In some embodiments, the Transponder of a vehicle that is not CVIS activated continues to receive interrogations, it simply does not respond. As such, the vehicle's Transponder may receive an interrogation specifying the vehicle's unique ID and ordering the vehicle to become CVIS active. Thus, from that time on, the Transponder of the vehicle will configure itself in a CVIS active mode and will begin responding to interrogations. This covert mode of CVIS activation may be used by the authorities where there is probable cause (as is the case with legal wire-tapping) to gather information on suspect behavior. A vehicle that has been CVIS activated by the above technique may become CVIS de-activated in response to an interrogation ordering the vehicle's Transponder back into a CVIS dormant mode.

10.3 Anti-Spoofing Embodiments of CVIS

A jamming device may be used in the vicinity of a CVIS Transponder to prevent the Transponder from deciphering interrogations and/or notifications and thus prevent the Transponder from ever responding to interrogations. The jamming device may be configured to jam the entire band over which the Transponder is configured to receive information from Interrogators and/or Notificators. In order to defeat this threat, the following embodiment may be used:

Since a Transponder knows the frequency that its receiver is tuned to, the Transponder's transmitter may be tuned to the same frequency to transmit an a priori known (to the Transponder receiver) message. In this mode, the transmitter of the Transponder may use a radiating element that is sufficiently apart (spatially) from the Transponder's receiving antenna element (one antenna element may be situated near the front of the vehicle while the other may be positioned near the rear of the vehicle). If the a priori known message that is transmitted by the Transponder's transmitter is not received reliably by the Transponder's receiver (while all other Transponder diagnostics are showing no malfunction) a warning signal/message/alarm may instruct the vehicle's operator to disable the jamming device. If the effect of the jamming device persists for more than a predetermined time interval (following the warning signal/message/alarm) then the vehicle's engine may, for example, stop.

In other embodiments, given the relatively low-cost nature of the Transponder, large-scale redundancy may be provided. Each vehicle may contain a plurality of Transponders, all networked together wirelessly (or otherwise) so that if one fails, the next can provide the necessary functions. The plurality of Transponder chip-sets may be situated in different areas of a vehicle so as to make it difficult to identify and disable. Transponder chip-sets may also be integrated with other electronic functions of a vehicle such that the Transponder assumes an amorphous (or distributed) nature, thus making it difficult for someone to identify, isolate, and disable, without also causing harm to other vehicular electronics.

10.4 Integration of GPS Signal-Processing & Satellite/Terrestrial Transceiver Units with the CVIS Transponder A vehicle may be equipped with GPS signal processing means and with a satellite/terrestrial transceiver capable of communicating directly with a CVIS CPU. Thus, a vehicle may attain a measure of its position from GPS signal processing. Furthermore, a vehicle may be interrogated via a terrestrial wireless system (cellular, PCS, or other) or via a satellite system. In response to such an interrogation, the vehicle may ascertain a measure of its position from processing of GPS signals and may relay directly to a CPU, via the satellite/terrestrial transceiver unit, information responsive to the interrogation.

10.5 Use of CVIS by Emergency Vehicles to Control Traffic Signals

Fire trucks, Police vehicles, ambulances, and other authorized vehicles may be equipped with Transponders capable of controlling the traffic signals at intersections along their path. A Transponder of an authorized vehicle may receive, from an Approaching Traffic Light Set Notificator, information regarding an approaching Traffic Light Set. The Transponder of the authorized vehicle may then use this information to command the Traffic Light Set in its path to turn green while all other Traffic Light Sets that may exist at the same intersection are commanded to turn red.

This embodiment of CVIS may provide significant additional safety to motorists, passengers of vehicles, and pedestrians that may be in the vicinity of an emergency vehicle while the emergency vehicle is pursuing its objective at high speed. A hearing impaired person, for example, who may not hear the sirens of an approaching emergency vehicle, may respond to the altered state of traffic signals. Similarly, a vehicle packed with teenagers, with their stereo blasting away at maximum setting, may not hear the sirens of an approaching emergency vehicle but may respond to the altered state of traffic signals.

In the drawings and specification, there have been disclosed embodiments of the invention and, although specific terms are employed, they are used in a generic and descriptive sense only and not for purposes of limitation, the scope of the invention being set forth in the following claims.

What is claimed is:

[1. A method of acquiring data from an entity; the method comprising:

configuring the entity to wirelessly transmit information using frequencies of a predetermined frequency band responsive to receiving at the entity a first signal from a first device;

transmitting the information from the entity using the frequencies of the predetermined frequency band responsive to said configuring and responsive to said receiving at the entity the first signal from the first device;

triggering a second device to transmit a second signal responsive to said transmitting the information from the entity; and transmitting data from the entity responsive to receiving at the entity the second signal from the second device.]

[2. The method according to claim 1, wherein said transmitting the information by the entity and/or said transmitting data by the entity comprises:

using by the entity a frequency that is provided by the first signal and/or second signal.]

[3. The method according to claim 1, further comprising:

configuring the entity to wirelessly communicate with the second device using frequencies of an unlicensed frequency band;

configuring the entity to wirelessly communicate with the first device using frequencies of a cellular frequency band;

configuring the entity to wirelessly receive information from the first device using frequencies of the cellular frequency band and to wirelessly relay the information that the entity receives from the first device to the second device by using frequencies of the unlicensed frequency band; and configuring the entity to wirelessly receive information from the second device using frequencies of the unlicensed frequency band and to wirelessly relay the information that the entity receives from the second device to the first device using frequencies of the cellular frequency band;

wherein the entity is transportable and/or mobile.]

[4. The method according to claim 3, wherein said configuring the entity to wirelessly communicate with the second device using frequencies of an unlicensed frequency band comprises:

receiving an activation message at the entity from the first device; and configuring the entity to wirelessly communicate with the second device using frequencies of the unlicensed frequency band responsive to said receiving an activation message at the entity from the first device.]

[5. The method according to claim 4, further comprising:

refraining by the entity from wirelessly communicating with the second device by using frequencies of the unlicensed frequency band barring having received at the entity the activation message from the first device.]

[6. A transceiver comprising:

a system that is configured to wirelessly transmit information using frequencies of a predetermined frequency band responsive to having received a first signal from h first device;

wherein the system is further configured to trigger a second device to transmit a second signal responsive to the system having received the first signal from the first device; and wherein the system is further configured to transmit data responsive to having received the second signal that is transmitted by the second device.]

[7. The transceiver according to claim 6, wherein the system is configured to wirelessly transmit the information and/or the data by using a frequency that is provided by the first signal and/or second signal.]

[8. The transceiver according to claim 6, wherein the system is further configured to:

wirelessly communicate with the second device using frequencies of an unlicensed frequency band;

wirelessly communicate with the first device using frequencies of a cellular frequency band;

wirelessly receive information from the first device over frequencies of the cellular frequency band and wirelessly relay the information that is received from the first device to the second device using frequencies of the unlicensed frequency band; and wirelessly receive information from the second device over frequencies of the unlicensed frequency band and wirelessly relay the information that is received from the second device to the first device using frequencies of the cellular frequency band;

wherein the transceiver is transportable and/or mobile.]

[9. The transceiver according to claim 8, wherein the transceiver is further configured to receive an activation message from the first device for the purpose of configuring the system of the transceiver to wirelessly communicate with the second device using frequencies of the unlicensed frequency band.]

[10. The transceiver according to claim 9, wherein the system is further configured to refrain from wirelessly communicating with the second device using frequencies of the unlicensed frequency band barring having received the activation message from the first device.]

[11. A wireless communications method comprising:

receiving a first signal at an entity from a first device over a short-range wireless link;

transmitting data from the entity to a second device over a long-range link responsive to having received the first signal at the entity from the first device over the short-range wireless link;

receiving a second signal at the entity from the second device over the long-range link; and exchanging data between the entity and the first device over the short-range wireless link, while refraining from exchanging data between the entity and the second device over the long-range link, responsive to having received the second signal at the entity from the second device over the long-range link.]

[12. The method of claim 11, wherein the long-range link comprises a wireless link and wherein transmitting data from the entity to the second device over the long-range link comprises transmitting data using frequencies of a licensed band.]

[13. The method of claim 12, wherein transmitting data using frequencies of a licensed band comprises transmitting data using frequencies of a cellular, PCS, microwave and/or satellite band of frequencies.]

[14. The method of claim 11, wherein transmitting data from the entity to the first device over the short-range wireless link comprises transmitting data using frequencies of an unlicensed band.]

[15. The method of claim 14, wherein transmitting data using frequencies of an unlicensed band comprises transmitting data using ISM band frequencies.]

[16. The method of claim 11, wherein the entity is mobile.]

[17. A transceiver comprising:

a system that is configured to receive a first signal from a first device over a short-range wireless link; to transmit data to a second device over a long-range link responsive to having received the first signal from the first device over the short-range wireless link; and to receive a second signal from the second device over the long-range link;

wherein the system is further configured to exchange data with the first device over the short-range wireless link, and to refrain from exchanging data with the second device over the long-range link, responsive to having received the second signal from the second device over the long-range link.]

[18. The transceiver according to claim 17, wherein the long-range link comprises a wireless link and wherein the system is configured to transmit data to the second device over the long-range link using frequencies of a licensed band.]

[19. The transceiver according to claim 18, wherein the frequencies of the licensed band comprise frequencies of a cellular, PCS, microwave and/or satellite band of frequencies.]

[20. The transceiver according to claim 17, wherein the system is configured to transmit data to the first device over the short-range wireless link using frequencies of an unlicensed band.]

[21. The transceiver according to claim 20, wherein the frequencies of the unlicensed band comprise ISM band frequencies.]

[22. The transceiver according to claim 17, wherein the transceiver is mobile.]

[23. A communications method comprising:

configuring an entity to wirelessly communicate with a first device using frequencies of a cellular frequency band;

configuring the entity to wirelessly communicate with a second device using frequencies of an unlicensed frequency band;

configuring the entity to wirelessly receive information from the first device using frequencies of the cellular frequency band and to wirelessly relay the information that the entity receives from the first device to the second device by using frequencies of the unlicensed frequency band; and configuring the entity to wirelessly receive information from the second device over frequencies of the unlicensed frequency band and to wirelessly relay the information that the entity receives from the second device to the first device using frequencies of the cellular frequency band;

wherein the entity is transportable and/or mobile; and wherein said configuring the entity to wirelessly communicate with a second device using frequencies of an unlicensed frequency band comprises:

wirelessly receiving an activation message at the entity from the first device;

configuring the entity to wirelessly communicate with the second device using frequencies of the unlicensed frequency band responsive to said wirelessly receiving an activation message at the entity from the first device; and refraining by the entity from wirelessly communicating with the second device by using frequencies of the unlicensed frequency band barring having received at the entity the activation message from the first device.]

[24. A transceiver comprising a system that is configured to:

wirelessly communicate with a first device using frequencies of a cellular frequency band;

wirelessly communicate with a second device using frequencies of an unlicensed frequency band;

wirelessly receive information from the first device over frequencies of the cellular frequency band and wirelessly relay the information that is received from the first device to the second device using frequencies of the unlicensed frequency band; and wirelessly receive information from the second device over frequencies of the unlicensed frequency band and wirelessly relay the information that is received from the second device to the first device using frequencies of the cellular frequency band;

wherein the system is further configured to wirelessly communicate with the second device using frequencies of the unlicensed frequency band responsive to having received an activation message from the first device;

wherein the system is further configured to refrain from wirelessly communicating with the second device by using frequencies of the unlicensed frequency band barring having received the activation message from the first device; and wherein the transceiver is transportable and/or mobile.]

[25. A method of acquiring data from an entity, the method comprising:

configuring the entity to wirelessly transmit information using frequencies of a predetermined frequency band responsive to receiving at the entity a first signal from a first device;

transmitting the information from the entity using the frequencies of the predetermined frequency band responsive to said configuring and responsive to said receiving at the entity the first signal from the first device;

triggering a second device to transmit a second signal responsive to said transmitting the information from the entity; and transmitting data from the entity responsive to receiving at the entity the second signal from the second device;

wherein the predetermined frequency band comprises frequencies of an unlicensed frequency band;

wherein said receiving at the entity a first signal from a first device comprises receiving at the entity the first signal from the first device over frequencies of a cellular frequency band; and wherein the entity is transportable and/or mobile.]

[26. The method according to claim 25, further comprising:

configuring the entity to wirelessly receive information from the first device using frequencies of the cellular frequency band and to wirelessly relay the information that the entity receives from the first device to the second device by using frequencies of the unlicensed frequency band; and configuring the entity to wirelessly receive information from the second device over frequencies of the unlicensed frequency band and to wirelessly relay the information that the entity receives from the second device to the first device using frequencies of the cellular frequency band.]

[27. The method according to claim 25, further comprising:

wirelessly receiving an activation message at the entity from the first device; and configuring the entity to wirelessly communicate with the second device using frequencies of the unlicensed frequency band responsive to said wirelessly receiving an activation message at the entity from the first device.]

[28. The method according to claim 27, further comprising:

refraining by the entity from wirelessly communicating with the second device by using frequencies of the unlicensed frequency band barring having received at the entity the activation message from the first device.]

[29. A transceiver comprising:

a system that is configured to:

wirelessly transmit information using frequencies of a predetermined frequency band responsive to having received a first signal from a first device;

wherein the system is further configured to trigger a second device to transmit a second signal responsive to the system having received the first signal from the first device; and wherein the system is further configured to transmit data responsive to having received the second signal that is transmitted by the second device;

wherein the system is configured to receive the first signal from the first device over frequencies of a cellular frequency band and to receive the second signal from the second device over frequencies of an unlicensed frequency band;

wherein the transceiver is transportable and/or mobile.]

[30. The transceiver according to claim 29, wherein the system is further configured to:

wirelessly receive information from the first device over frequencies of the cellular frequency band and wirelessly relay the information that is received from the first device to the second device using frequencies of the unlicensed frequency band; and wirelessly receive information from the second device over frequencies of the unlicensed frequency band and wirelessly relay the information that is received from the second device to the first device using frequencies of the cellular frequency band.]

[31. The transceiver according to claim 29, wherein the transceiver is further configured to receive an activation message from the first device for the purpose of configuring the system of the transceiver to wirelessly communicate with the second device using frequencies of the unlicensed frequency band.]

[32. The transceiver according to claim 31, wherein the system is further configured to refrain from wirelessly communicating with the second device using frequencies of the unlicensed frequency band barring having received the activation message from the first device.]

*33. A method of acquiring data from an entity; the method comprising:*

*receiving at the entity a first signal from a first device that is external to the entity and at a distance from the entity;*

*relaying by the entity first data responsive to, and based upon, information that the entity receives from the first signal of the first device;*

*triggering a second device that is external to the entity and at a distance from the entity to transmit a second signal responsive to said relaying by the entity first data;*

*receiving at the entity the second signal;*

*transmitting by the entity second data responsive to receiving at the entity the second signal; and*

*receiving a confirmation at the entity that the second data has been received at the second device;*

*wherein said relaying by the entity first data comprises:*

*over a first interval of time, transmitting by the entity a broadcast message at a rate of twice per second, and then, over a second interval of time that follows the first interval of time, ceasing transmissions by the entity of the broadcast message at said rate of twice per second.*

*34. The method according to claim 33,*

*wherein said receiving at the entity a first signal from a first device comprises: wirelessly receiving the first signal at the entity from the first device and directly receiving the first signal at the entity from the first device;*

*wherein said relaying by the entity first data comprises: wirelessly relaying by the entity the first data and directly relaying by the entity the first data to the second device;*

*wherein said triggering a second device that is external to the entity and at a distance from the entity to transmit a second signal comprises: wirelessly triggering the second device to transmit the second signal, directly triggering the second device to transmit the second signal and exclusively triggering the second device to transmit the second signal;*

*wherein said receiving at the entity the second signal comprises: wirelessly receiving at the entity the second signal, directly receiving at the entity the second signal*

*from the second device and exclusively receiving at the entity the second signal from the second device;*

*wherein said transmitting by the entity second data comprises: wirelessly transmitting by the entity the second data, directly transmitting by the entity the second data to the second device and exclusively transmitting by the entity the second data to the second device; and*

*wherein said receiving a confirmation at the entity that the second data has been received by the second device comprises: wirelessly receiving the confirmation at the entity that the second data has been received by the second device, directly receiving the confirmation at the entity from the second device that the second data has been received by the second device and exclusively receiving the confirmation at the entity from the second device that the second data has been received by the second device.*

*35. The method according to claim 33, wherein said relaying by the entity further comprises:*

*wirelessly transmitting by the entity only once per 0.5 seconds and over a plurality of 0.5 second intervals that are successive and adjacent to one another, followed by wirelessly transmitting and receiving by the entity a plurality of signals that are associated to said relaying comprising the second signal, the second data and the confirmation, followed by ceasing of said wirelessly transmitting by the entity only once per 0.5 seconds.*

*36. A transponder comprising a receiver and a transmitter;*

*wherein the receiver is configured to receive a first signal from a first device that is external to the transponder and at a distance from the transponder;*

*wherein the transmitter is configured to relay first data responsive to, and based upon, information that the receiver receives from the first signal and to trigger a second device, that is external to the transponder and at a distance from the transponder, to transmit a second signal responsive to the transmitter having relayed said first data;*

*wherein the receiver is further configured to receive the second signal;*

*wherein the transmitter is further configured to transmit second data responsive to having received the second signal;*

*wherein the receiver is further configured to receive a confirmation that the second data has been received at the second device; and*

*wherein the transmitter is further configured to transmit a broadcast message by transmitting, over a first interval of time, at a rate of twice per second, and then, over a second interval of time that follows the first interval of time, to cease transmissions at said rate of twice per second.*

*37. The transponder according to claim 36,*

*wherein said receiver is further configured to receive the first signal from the first device wirelessly and directly therefrom;*

*wherein the transmitter is further configured to relay to a second device first data wirelessly and directly thereto and to trigger the second device to transmit the second signal wirelessly, directly and exclusively to the receiver;*

*wherein the receiver is further configured to receive the second signal from the second device wirelessly, directly and exclusively therefrom;*

*wherein the transmitter is further configured to transmit second data to the second device wirelessly, directly and exclusively thereto; and*

*wherein the receiver is further configured to receive the confirmation from the second device wirelessly, directly and exclusively therefrom.*

*38. The transponder according to claim 36, wherein the transponder is further configured to:*

*wirelessly transmit first data only once per a 0.5 seconds interval and over a plurality of 0.5 second intervals that are successive and adjacent to one another; then*

*wirelessly transmit and receive a plurality of signals comprising the second signal, the second data and the confirmation; and then*

*cease the wireless transmissions of first data at said 0.5 seconds interval and over a plurality of 0.5 second intervals that are successive and adjacent to one another.*

*39. A method comprising:*

*transmitting a first signal by an entity responsive to receiving at the entity information;*

*triggering a device that is external to the entity and at a distance from the entity to transmit a second signal responsive to said transmitting a first signal by an entity;*

*receiving at the entity the second signal from the device that is external to the entity and at a distance from the entity; and*

*transmitting data by the entity responsive to receiving at the entity the second signal from the device that is external to the entity and at the distance from the entity;*

*wherein said transmitting a first signal by an entity responsive to receiving at the entity information comprises:*

*repeatedly transmitting the first signal by the entity; and then*

*ceasing transmissions of the first signal by the entity responsive to receiving at the entity a confirmation signal;*

*wherein said repeatedly transmitting the first signal by the entity comprises:*

*transmitting the first signal by the entity over a first interval of time followed by transmitting the first signal by the entity over a second interval of time that follows the first interval of time and is adjacent thereto; then*

*transmitting a plurality of signals by the entity and receiving a plurality of signals by the entity over a third interval of time that follows the second interval of time and is adjacent to the second interval of time; and then*

*ceasing transmissions by the entity over a fourth interval of time that follows the third interval of time and is adjacent thereto;*

*wherein over the third interval of time said transmitting a plurality of signals comprises:*

*transmitting the first signal and transmitting the data; and*

*wherein over the third interval of time said receiving a plurality of signals comprises:*

*receiving the second signal; and*

*receiving the confirmation signal.*

*40. The method according to claim 39,*

*wherein said transmitting a first signal by an entity comprises: wirelessly transmitting the first signal by the entity;*

*wherein said triggering a device that is external to the entity and at a distance from the entity to transmit a second signal comprises: wirelessly and directly trig-*

*gering the device that is external to the entity and at the distance from the entity to transmit the second signal;*

*wherein said receiving at the entity the second signal comprises: receiving at the entity the second signal wirelessly, directly and exclusively from the device that is external to the entity and at the distance from the entity;*

*wherein said transmitting data by the entity responsive to receiving at the entity the second signal comprises: transmitting data by the entity wirelessly, directly and exclusively to the device that is external to the entity and at the distance from the entity;*

*wherein said repeatedly transmitting the first signal by the entity comprises: repeatedly and wirelessly transmitting the first signal by the entity;*

*wherein said transmitting the first signal by the entity over a first interval of time comprises: wirelessly transmitting the first signal by the entity over the first interval of time;*

*wherein said transmitting the first signal by the entity over a second interval of time that follows the first interval of time comprises: wirelessly transmitting the first signal by the entity over the second interval of time that follows the first interval of time;*

*wherein said transmitting a plurality of signals by the entity and receiving a plurality of signals by the entity over a third interval of time that follows the second interval of time and is adjacent to the second interval of time comprises: wirelessly transmitting the plurality of signals by the entity and wirelessly receiving the plurality of signals by the entity over the third interval of time that follows the second interval of time and is adjacent to the second interval of time;*

*wherein said receiving a confirmation signal at the entity comprises: wirelessly receiving the confirmation signal at the entity; and*

*wherein said receiving at the entity information comprises: wirelessly receiving at the entity information.*

*41. A transponder that is configured to:*

*receive information;*

*transmit a first signal responsive to having received the information;*

*trigger a device that is external to the transponder and at a distance from the transponder to transmit a second signal responsive to having transmitted by the transponder the first signal;*

*receive the second signal; and*

*transmit data responsive to having received the second signal;*

*wherein, responsive to having received the information, the transponder is further configured to transmit the first signal repeatedly and then, to cease transmissions of the first signal responsive to having received a confirmation signal associated therewith;*

*wherein the transponder is further configured to perform operations comprising:*

*transmitting the first signal over a first interval of time followed by transmitting the first signal over a second interval of time that follows the first interval of time and is adjacent thereto; then*

*transmitting a plurality of signals and receiving a plurality of signals over a third interval of time that follows the second interval of time and is adjacent to the second interval of time; and then*

*ceasing transmissions over a fourth interval of time that follows the third interval of time and is adjacent thereto;*

*wherein over the third interval of time said transmitting a plurality of signals comprises:*

*transmitting the first signal and transmitting the data; and*

*wherein over the third interval of time said receiving a plurality of signals comprises:*

*receiving the second signal; and*

*receiving the confirmation signal.*

*42. The transponder according to claim 41, wherein the transponder is further configured to perform operations comprising:*

*wirelessly transmitting the first signal;*

*wirelessly and directly triggering the device that is external to the transponder and at the distance from the transponder to transmit the second signal;*

*receiving the second signal wirelessly, directly and exclusively from the device that is external to the transponder and at said distance from the transponder;*

*transmitting the data directly and exclusively to the device that is external to the transponder and at said distance from the transponder;*

*repeatedly and wirelessly transmitting the first signal;*

*wirelessly transmitting the first signal over the first interval of time;*

*wirelessly transmitting the first signal over the second interval of time that follows the first interval of time;*

*wirelessly transmitting the plurality of signals and wirelessly receiving the plurality of signals over the third interval of time that follows the second interval of time and is adjacent to the second interval of time;*

*wirelessly receiving the confirmation signal; and*

*wirelessly receiving the information.*

* * * * *